United States Patent [19]
Matsuoka et al.

[11] Patent Number: 5,749,556
[45] Date of Patent: May 12, 1998

[54] ROTATING APPARATUS

[75] Inventors: Hiroshi Matsuoka; Kazuo Chimura; Shigeki Kariya, all of Nagaokakyo, Japan

[73] Assignee: Mitsubishi Denki Kabushiki Kaisha, Tokyo, Japan

[21] Appl. No.: 365,403

[22] Filed: Dec. 28, 1994

[30] Foreign Application Priority Data

Dec. 28, 1993 [JP] Japan ..................... 5-335382

[51] Int. Cl.$^6$ ............... F16M 13/00; F16H 1/16
[52] U.S. Cl. ............ 248/349.1; 74/89.14; 74/425; 248/425; 248/922
[58] Field of Search ............ 348/349.1, 131, 348/425, 664, 919, 920, 921, 922; 74/425, 89.14

[56] References Cited

U.S. PATENT DOCUMENTS

| | | | |
|---|---|---|---|
| 1,468,247 | 9/1923 | Patten | 248/349.1 X |
| 1,731,011 | 10/1929 | Krawitz | 248/349.1 X |
| 3,615,068 | 10/1971 | Edelstein | 248/349.1 |
| 4,040,307 | 8/1977 | Koster | 74/425 |
| 4,258,966 | 3/1981 | Grubb, Jr. | 248/349.1 X |
| 4,330,696 | 5/1982 | Pomeroy et al. | 248/349.1 X |
| 4,547,027 | 10/1985 | Scheibenreif | 248/921 X |
| 4,555,990 | 12/1985 | Egawa | 248/349.1 X |
| 4,635,894 | 1/1987 | Sommom | 248/349.1 X |
| 4,697,778 | 10/1987 | Harashima | 248/349.1 |
| 4,796,842 | 1/1989 | Hamada et al. | |
| 4,802,706 | 2/1989 | Onimaru et al. | 248/425 X |
| 4,905,532 | 3/1990 | Fukumoto et al. | |
| 4,922,275 | 5/1990 | Hughes | 248/349.1 X |
| 4,969,290 | 11/1990 | Skoretz | 248/349.1 X |
| 4,993,277 | 2/1991 | Adam et al. | 74/425 |
| 5,149,043 | 9/1992 | Grundmann | 248/349.1 |
| 5,243,434 | 9/1993 | Nodama | 248/922 X |

FOREIGN PATENT DOCUMENTS

| | | |
|---|---|---|
| 3526625 A1 | 1/1987 | Germany . |
| 62-24781 | 2/1989 | Japan . |
| 4-28141 | 5/1989 | Japan . |
| 428141 | 7/1992 | Japan . |
| 1116495 | 6/1968 | United Kingdom . |

*Primary Examiner*—Derek J. Berger

[57] ABSTRACT

A rotating apparatus for rotating an object utilizes a worm gear in which worm wheel torque supplied from a rotation table can be transferred to a worm gear. In this way the invention avoids a conventional disengaging mechanism that disengages the rotating apparatus when torque is supplied from the rotation table. Further, spring members and stoppers physically define a first and second rotation ranges and a split cam shuts off a drive motor within the first rotation range. Still further, an anti-backlash member is provided on the worm gearing. To prevent pinched fingers and dust accumulation, a skirt is preferably provided on the bottom, front edge of the object being rotated which closes a gap between the object and a support surface when the object is placed on the rotating apparatus.

16 Claims, 32 Drawing Sheets

5,749,556

1

ROTATING APPARATUS

BACKGROUND OF THE INVENTION

1. Field of the Invention

The present invention relates to a rotating apparatus for mounting or integrated with a display device such as a television set and a display of a computer so as to rotate the display device.

2. Description of Related Art

FIG. 1 is a partially exploded plan view of a conventional rotating apparatus disclosed in Japanese Utility Model Application Publication No. 4-28141 (1992), and FIG. 2 is a sectional view taken along line II—II of FIG. 1. The rotating apparatus shown in FIGS. 1 and 2 comprises a base 61, a mounting table 70, a motor 82 and a power supply 62.

The base 61 includes a disk-shaped bottom 61a having a peripheral wall 61b in the periphery thereof. At the center of the bottom 61a is disposed a bearing 61c in the shape of a concave, which has an opening 61d at the center. On the inner surface of the peripheral wall 61b of the base 61 are provided with six disk-shaped rotators 65 at positions dividing the circumference of the bottom 61a into six. Each of the rotators 65 has a rotation axis along the radial of the bottom 61a.

The mounting table 70 includes a disk member 71 slightly smaller than the bottom 61a of the base 61, an outer peripheral wall 72 formed around the entire periphery of the disk member 71 so as to project downward at right angles from the disk member 71, and an inner peripheral wall 75 formed inside of and facing to the outer peripheral wall 72 with a predetermined interval therebetween. Along the entire inner surface of the inner peripheral wall 75 is disposed an inner gear 75a. Around the external lower edge of the outer peripheral wall 72 is formed a projecting line 73, which is provided with a groove 73a on the bottom surface. The groove 73a is engaged with the rotators 65 on the base 61 so as to rotatably support the mounting table 70 on the base 61.

At the center of the bottom surface of the disk member 71 is provided a cylindrical axis 74, whose tip portion has a smaller diameter than the other portion thereof. The tip portion of the axis 74 is rotatably fit in the opening 61d in the bearing 61c described above. Below the bearing 61c of the base 61 is provided a ring-shaped washer 91. A bolt 90 is inserted from the bottom through the washer 91 and the opening 61d so as to be screwed into the tip portion of the axis 74, thereby preventing the mounting table 70 from coming off the base 61.

The motor 82 has a rotation axis 82a parallel to the bottom 61a of the base 61, and a worm gear 83 is fixed on the rotation axis 82a. The worm gear 83 is engaged with a worm wheel 85b fixed on a first axis 85a formed on the side of the rotation axis 82a closer to the peripheral wall 61b of the base 61. A first pinion 85c, which is integrally formed with the worm wheel 85b, is engaged with a second gear 86b fixed on a second axis 86a formed on the side of the first axis 85a closer to the peripheral wall 61b of the base 61.

A second pinion 86c, which is integrally formed with the second gear 86b, is engaged with a third gear 87b penetrating a third axis 87a formed on the side of the second axis 86a closer to the peripheral wall 61b of the base 61. A third pinion 87c fixed on the third axis 87a and connected with the third gear 87b through a disk 87d is engaged with the inner gear 75a of the mounting table 70. The driving torque generated by the motor 82 is transferred to the inner gear 75a

2 of the mounting table 70 through the worm gear 83, the worm wheel 85b, the pinions 85c, 86c and 87c and the gears 86b and 87b, thereby rotating the mounting table 70 in the clockwise or counterclockwise direction depending upon the forward or reverse rotation direction of the motor 82.

FIG. 3 is a partially exploded enlarged view of the third axis 87a. On part of the bottom surface of the disk 87d, which is integrally formed with the third pinion 87c on the bottom surface thereof, is formed a groove 87f in the radial direction. On the surface of the third gear 87b facing the disk 87d is formed a projection 87e so as to correspond to the groove 87f. The third gear 87b, through which the third axis 87a is inserted, is vertically movable, and is in contact with the disk 87d by the pressure applied by a spring 88. The rotation of the third gear 87b is transferred to the third pinion 87c through the engagement between the projection 87e of the third gear 87b and the groove 87f of the disk 87d.

In such a rotating apparatus, the power supply 62 is operated by a signal supplied from a remote controller (not shown) so as to rotate the motor 82 in the forward or reverse direction or to stop the motor 82. Through the clockwise or counterclockwise rotation of the mounting table 70 caused by the forward or reverse rotation of the motor 82, a display device mounted on the mounting table 70 is rotated at a desired angle.

During the rotation of the mounting table 70, when the display device comes in contact with furniture or the like, the third pinion 87c engaged with the inner gear 75a of the mounting table 70 becomes locked. At this point, although the rotation of the motor 82 is transferred to the third gear 87b, the third gear 87b moves downward against the pressure applied by the spring 88 because the third pinion 87c is locked. As a result, the projection 87e of the third gear 87b is disengaged from the groove 87f on the disk 87d disposed on the third pinion 87c. Thus, the rotation of the third gear 87b is not transferred to the third pinion 87c. The inner gear 75a, the worm gear 83, the worm wheel 85b, the pinions 85c, 86c and 87c, the gear 86b and 87b, and the motor 82 are protected from being damaged by rotating the third gear 87b alone in this manner.

In order to change the facing direction of the display device, if the display device or the mounting table 70 is applied with a force by a hand or the like without using the rotation of the motor 82, the force is transferred to the worm wheel 85b. The worm gear 83, however, is not rotated by the rotation of the worm wheel 85b, namely the worm gear 83 has so-called an automatic clamping function. Accordingly, the third gear 87b moves downward against the pressure of the spring 88 and the groove 87f of the disk 87d is disengaged from the projection 87e on the third gear 87b as in the aforementioned case, thereby the mounting table 70 and the display device thereon are rotated.

Japanese Patent Application Laid-Open No. 62-24781 (1987) discloses another type of a rotating apparatus. This rotating apparatus comprises a disk-shaped retainer provided with a plurality of balls in the periphery thereof instead of the disk-shaped rotators 65 in FIG. 1 and a plurality of ball containing holes each with a diameter slightly larger than that of the ball for supporting the balls and maintaining a constant interval among the balls. Since the configuration is thus simplified, the cost can be reduced and the apparatus becomes thinner.

In either conventional rotating apparatus, however, the assemblage is complicated and the production efficiency is low because, when a gear is locked during the rotation or when the apparatus is manually rotated, the projection 87e on the third gear 87b is disengaged from the groove 87f on the disk 87d disposed on the third pinion 87c engaged with the inner gear 75a of the mounting table 70. In addition, a large number of processing procedures are required, resulting in increasing a production cost. Further, the conventional rotating apparatus has a poor durability due to the abrasion of the groove 87f and the projection 87e affecting the rotation of the display device. Moreover, the rotating apparatus disclosed in Japanese Patent Application Laid-Open No. 62-24781 (1987), which comprises the retainer provided with the balls and the ball containing holes for rotatably supporting the mounting table, has the following disadvantages: Since the diameter of the ball containing hole is larger than that of the ball so as to achieve free movement of the ball therein, the ball can be dropped from the retainer during the assemblage. As a result, the handling is poor, and the assembling efficiency and the production efficiency are both low.

SUMMARY OF THE INVENTION

The present invention was devised to solve the above-mentioned problems, and one of the objectives of the invention is providing a rotating apparatus having an improved production efficiency by adopting a configuration where torque of a worm wheel can be transferred to a worm gear without using the conventional disengaging mechanism.

The rotating apparatus of this invention comprises a motor, a worm gear fixed on the rotation axis of the motor and a worm wheel engaged with the worm gear. The worm gear and the rotation axis are rotated by torque supplied to the worm wheel through a gear included in a driving device for rotating a rotation table rotatably supported on a base.

Alternatively, the rotating apparatus of this invention comprises a motor, a worm gear fixed on the rotation axis of the motor and a worm wheel engaged with the worm gear. The worm gear, which is included in a driving device for rotating a rotation table rotatably supported on a base, has a lead angle sufficient for transferring torque from the worm wheel to the worm gear.

Further, in the rotating apparatus of the invention, the lead angle γ of the worm gear satisfies the following formula:

$$F_S \cdot (\cos \alpha \cdot \sin \gamma - \mu \cdot \cos \gamma) > 0$$

wherein $F_S$ indicates a circumferential force of the worm wheel, α indicates a pressure angle, and μ indicates a friction coefficient.

Accordingly, when the rotation table is locked during the rotation, the locking force is transferred from the worm wheel through the worm gear to the rotation axis of the motor, thereby stopping the rotation of the motor. When the rotation table is applied with an external force without using the rotation of the motor, the applied force is transferred through the worm wheel and the worm gear to the rotation axis of the motor, thereby rotating both the motor and the rotation table. Thus, there is no need to use the disengaging mechanism as in the conventional rotating apparatus, resulting in decrease of the number of the components and the processing procedures and improvement of the assembling and production efficiency of the rotating apparatus.

Another objective of the present invention is providing a rotating apparatus having high assembling and production efficiency with improved handling by forming a projection at the peripheral edge of a ball containing hole in a retainer for holding the ball therein.

The rotating apparatus of the invention comprises a plurality of balls disposed between a base and a rotation table and a retainer having a plurality of holes for holding the balls formed with a predetermined interval thereamong. At the peripheral edge of each hole is formed a projection for holding the ball therein.

Further, in one embodiment of the rotating apparatus of the invention, the retainer is formed by connecting a plurality of belt-shaped members.

Accordingly, the balls are held on the retainer by the projections. Therefore, there is not the slightest fear of dropping the balls off the retainer during the assemblage of the retainer and the balls, resulting in increasing the assembling and production efficiency.

Furthermore, in another embodiment of the rotating apparatus of the invention, the retainer and the balls are integrally formed so that the balls are freely movable at certain positions on the retainer.

Accordingly, the number of the assembling procedures can be reduced because there is no need to combine the retainer with the balls, resulting in further increasing the production efficiency.

The above and further objects and features of the invention will more fully be apparent from the following detailed description with accompanying drawings.

DESCRIPTION OF THE PREFERRED EMBODIMENTS

The present invention will now be described in detail referring to the accompanying drawings illustrating the embodiments thereof.

Figure 1:
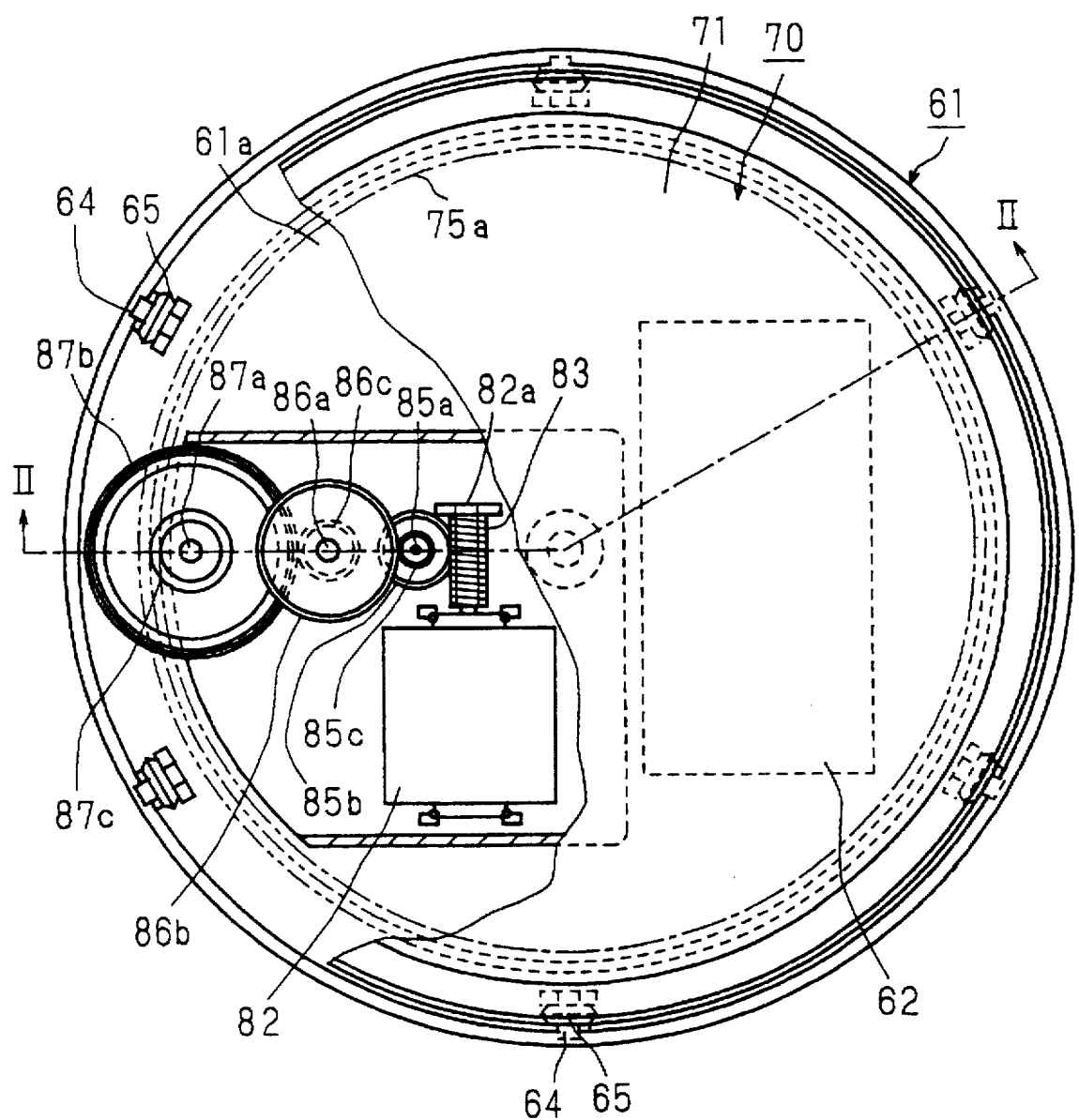
FIG. 1 is a partially exploded plan view of a conventional rotating apparatus.
Figure 2:
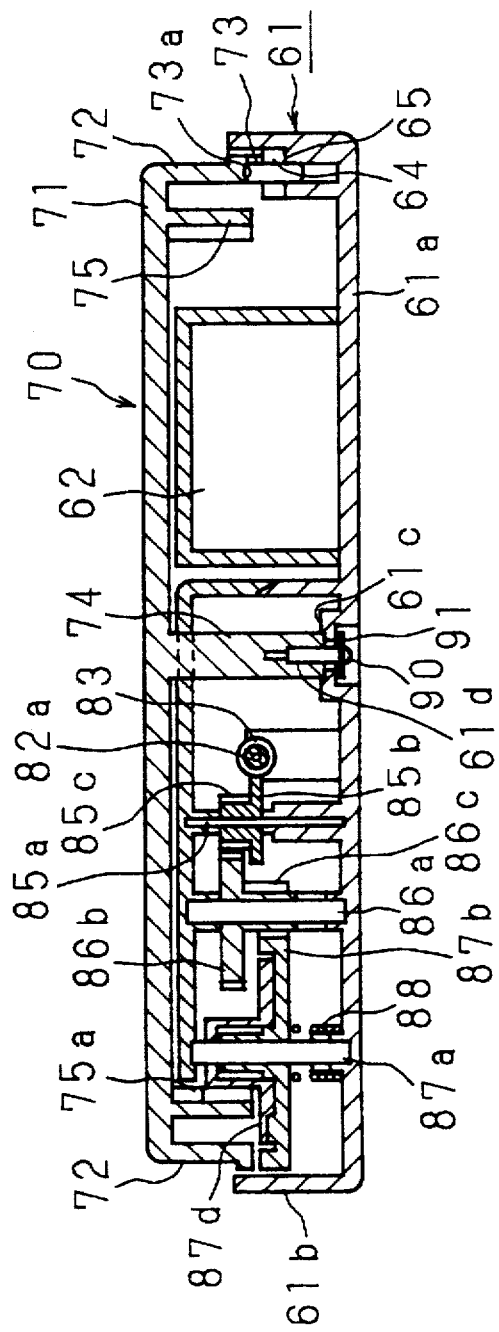
FIG. 2 is a sectional view taken along line 11—11 of FIG. 1.
Figure 3:
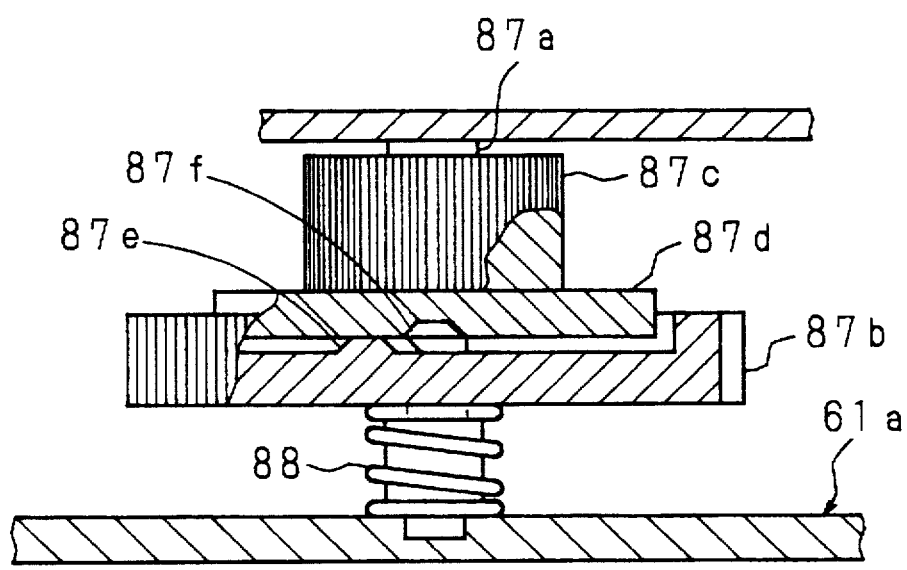
FIG. 3 is a partially exploded enlarged view of a third axis shown in FIG. 2.
Figure 4:
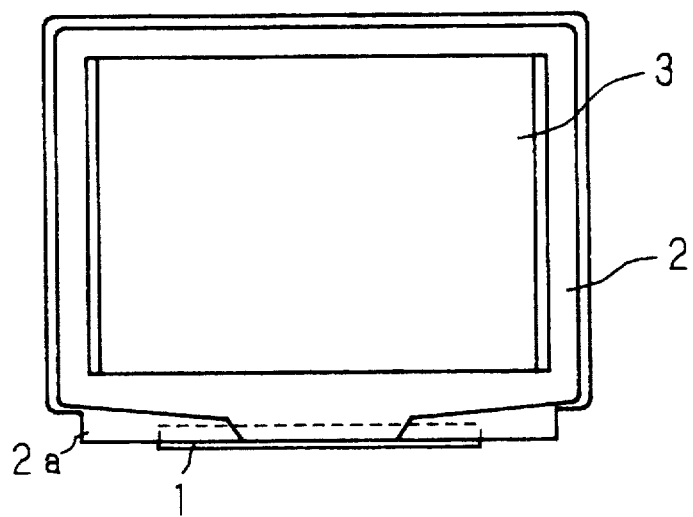
FIG. 4 is a front view of a rotating apparatus according to the present invention.
Figure 5:
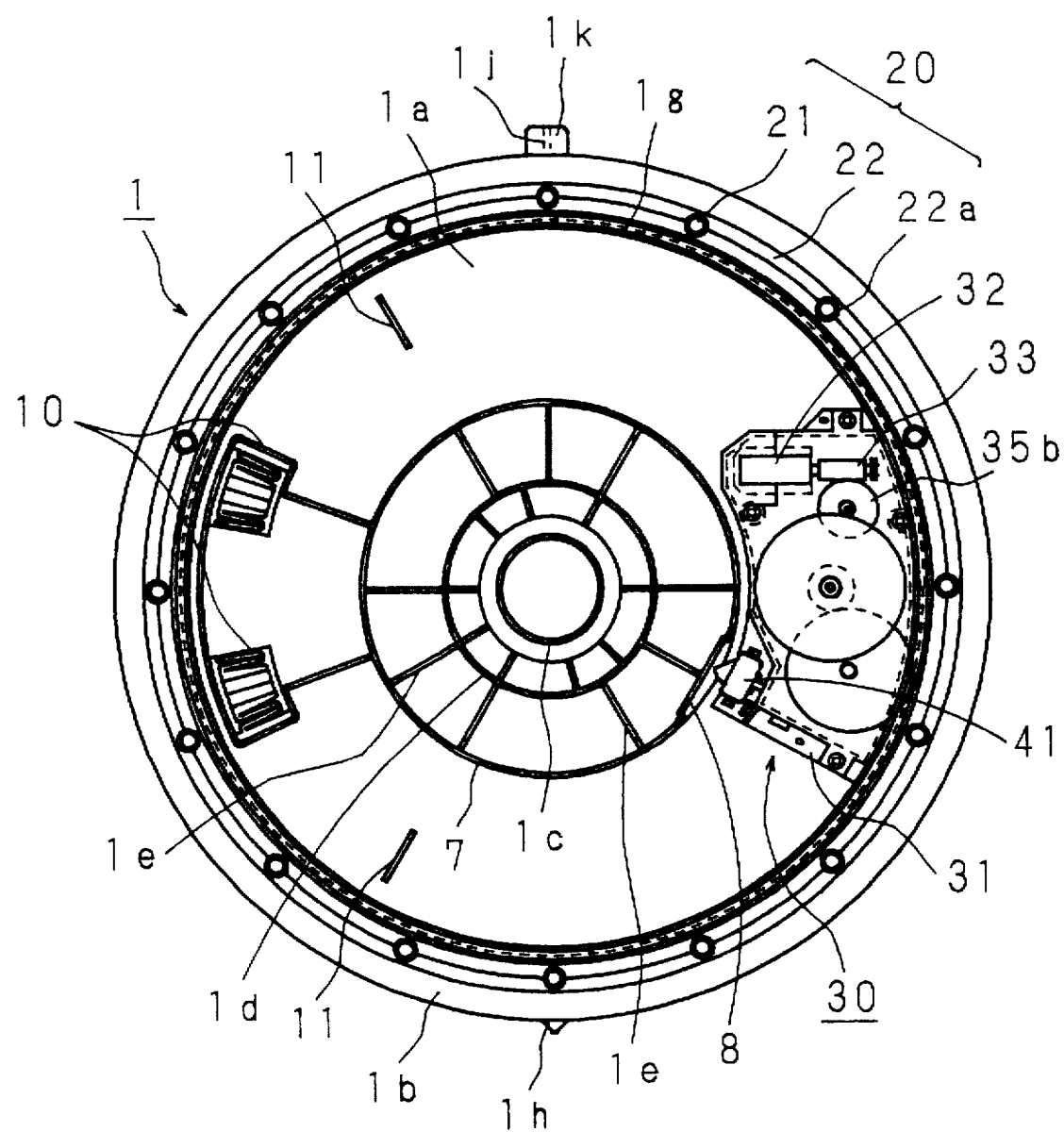
FIG. 5 is a schematic plane diagram of the rotating apparatus according to the present invention.
Figure 6:
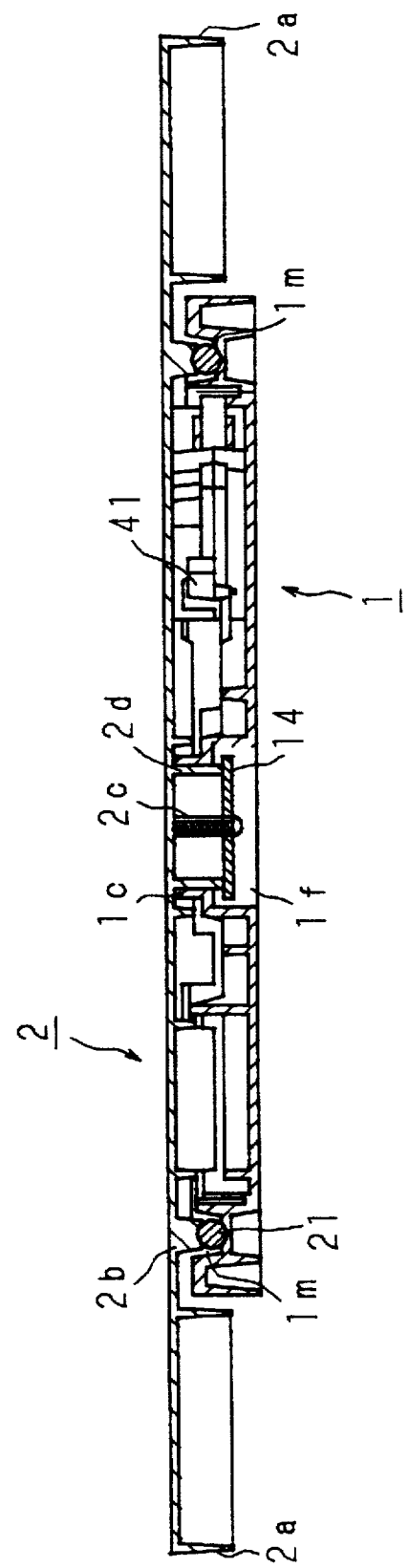
FIG. 6 is a vertical sectional view of the rotating apparatus according to the present invention.

FIG. 4 is a front view of a rotating apparatus according to the present invention. FIGS. 5 and 6 are a schematic plane diagram and a vertical sectional view, respectively, of the major part of the rotating apparatus of FIG. 4. As is shown in FIG. 4, the rotating apparatus of the invention comprises a cabinet 2 supporting a CRT (cathode ray tube) 3 and a circular base 1 disposed below the cabinet 2 so as to rotatably support the cabinet 2. A belt-shaped skirt 2a is provided at the lower edge of the cabinet 2 so as to prevent a hand, a finger or the like from being pinched in the gap between the cabinet 2 and the base 1.

As shown in FIGS. 5 and 6, the base 1 includes a circular bottom 1a provided with an outer peripheral wall 1b at the periphery. On the inner surface of the outer peripheral wall 1b is provided an inner gear 1g. At the center of the bottom 1a is formed a recess 1f having an opening at the center. Around the upper edge of the opening is formed a center wall 1c projecting upward, and an inner peripheral wall 1d is formed on the outside of the center wall 1c. On the outer surface of the inner peripheral wall 1d is provided a ring rib 7, which is connected with the inner peripheral wall d through a plurality of stiffening ribs 1e. On the upper surface of the outer peripheral wall 1b is formed a groove 1m, which is provided with a unit roller 20. The unit roller 20 comprises a plurality of balls 21 and a flat ring-shaped retainer 22, in which a plurality of holding holes 22a for movably holding the balls 21 are formed with a predetermined interval thereamong.

On the bottom surface of the cabinet 2 is formed a ring 2b opposing the groove 1m formed on the outer peripheral wall 1b of the base 1. The ring 2b is engaged with the unit roller 20 of the base 1, thereby rotatably supporting the cabinet 2 on the base 1. The bottom surface of the cabinet 2 is also provided with a cylindrical member 2c for screwing at the center and an inner ring 2d for fitting with the center wall 1c of the base 1 on the outside of the cylindrical member 2c. At the lower edge of the inner ring 2d, a disk-shaped washer 14, which has a diameter larger than that of the center wall 1c of the base 1 and smaller than that of the recess 1f, is screwed on the cylindrical member 2c, thereby preventing the base 1 from coming off the cabinet 2.

Further, a center boss 1h is projecting from the outer surface of the outer peripheral wall 1b of the base 1 as a standard mark of the rotation of the cabinet 2. A back center boss 1k is also provided on the outer surface of the outer peripheral wall at a position at an angle of 180° from the position of the center boss 1h. The back center boss 1k is provided with a hole 1j for screwing. The base 1 is fixed on the cabinet 2 by screwing a screw (not shown) into the hole 1j.

The base 1 is provided with spring members 10 for controlling the rotation range of the cabinet 2 formed with a predetermined distance therebetween along the circumference of the outer peripheral wall 1b. Away from the spring members 10 by a predetermined distance along the circumference are provided flat stoppers 11 formed along the radial direction of the bottom 1a. The bottom surface of the cabinet 2 is provided with a bar 2e, which will be described in detail below, so that the bar 2e is located at the circumferential center between the spring members 10 when the center of the image screen of the CRT 3 corresponds to the position of the center boss 1h. At this point, the center of the screen of the CRT 3 coincides with the position of the center boss 1h, which means that tile cabinet 2 is located at the center of the rotation range.

Figure 7:
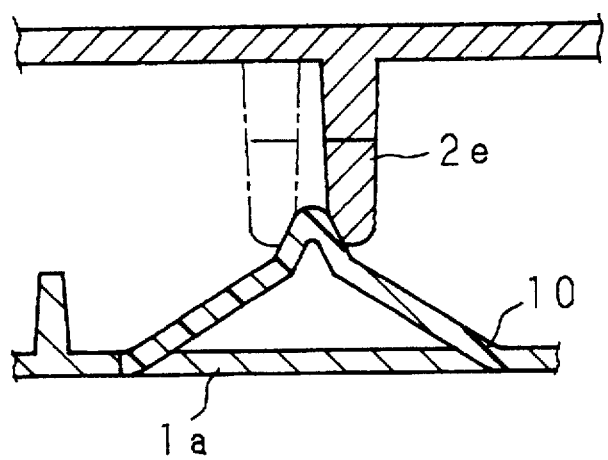
FIG. 7 is an enlarged side view of a spring member and a bar used in the rotating apparatus according to the present invention.

FIG. 7 is an enlarged side view of one of the spring members 10 and the bar 2e. The spring member 10 which is in the crooked shape is formed so as to be projecting on the base 1. When the cabinet 2 is rotated by the driving torque supplied from a motor described below, the bar 2e projecting from the bottom surface of the cabinet 2 is caught by the spring member 10, thereby stopping the rotation of the cabinet 2. When the cabinet 2 is manually rotated without using the driving torque of the motor, the bar 2e can pass the spring member 10, and the cabinet 2 can be further rotated until the bar 2e comes in contact with one of the stoppers 11 described above.

As shown in FIG. 5, below the cabinet 2 are disposed a motor 32 and a unit case 31 containing a built-in gear unit 30 including a plurality of gears for transferring the torque of the motor 32 to the base 1.

Figure 8:
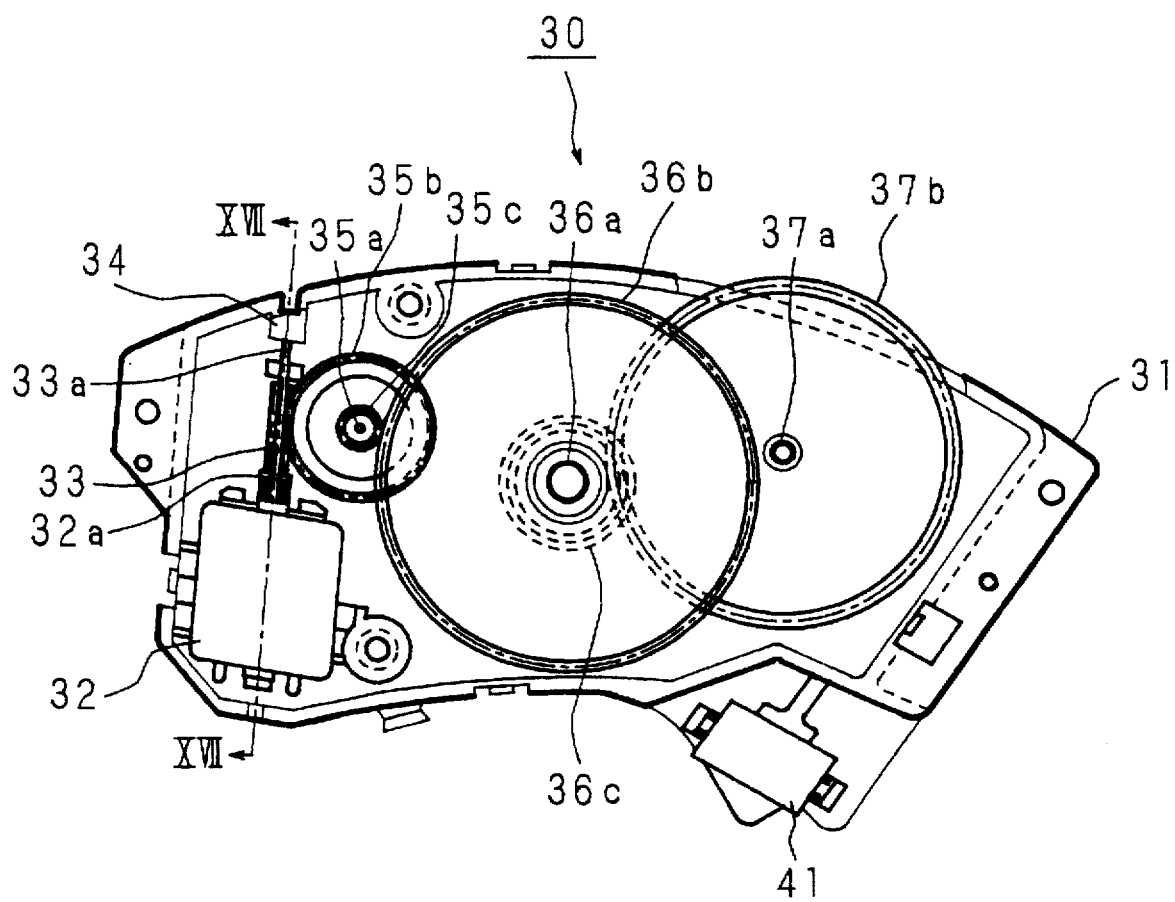
FIG. 8 is an enlarged view of a motor and a gear unit used in the rotating apparatus according to the present invention.

FIG. 8 is an enlarged view of the motor 32 and the gear unit 30. The motor 32 is disposed so as to have a rotation axis 32a parallel to the bottom surface of the cabinet 2, and is connected with a power supply (not shown) for applying the motor 32 with a voltage less than half a regulated voltage of the motor 32. A worm gear 33 is fixed on the rotation axis 32a of the motor 32. The worm gear 33 is engaged with a worm wheel 35b fixed on a first axis 35a. A first pinion 35c integrally formed with the worm wheel 35b is engaged with a second gear 36b fixed on a second axis 36a. A second pinion 36c integrally formed with the second gear 36b is engaged with a third gear 37b fixed on a third axis 37a, and the third gear 37b is engaged with the inner gear 1g (see FIG. 5) of the base 1. The first axis 35a, the second axis 36a and the third axis 37a are disposed in the circumferential direction from the rotation axis 32a of the motor 32 in this order. The reduction ratio of the gear unit 30 is set at a sufficient value for rotating the cabinet 2.

Figure 9:
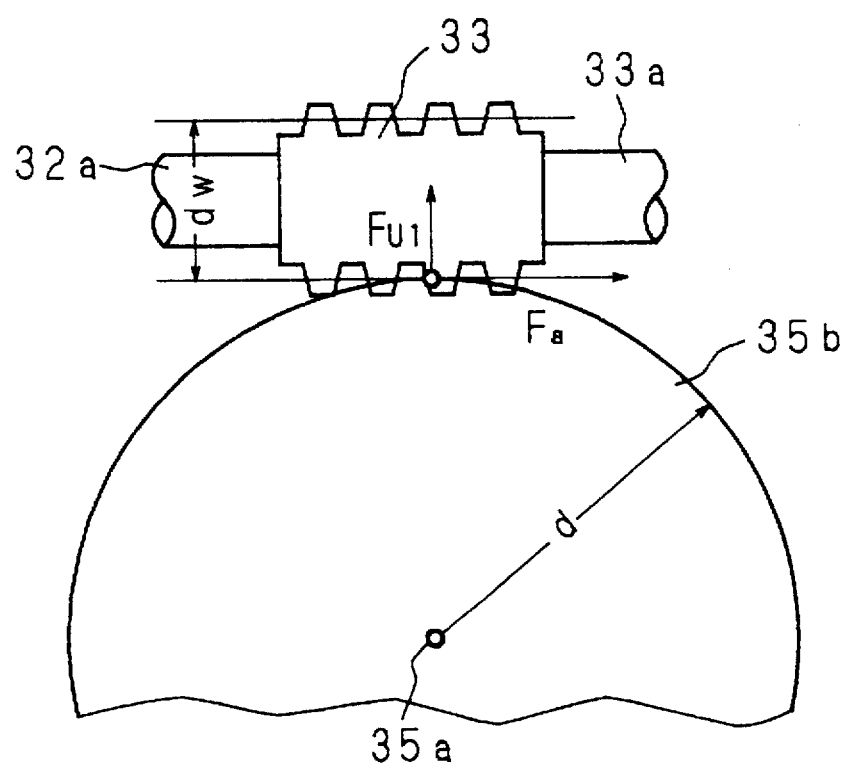
FIG. 9 is a schematic plane diagram of a worm gear and a worm wheel shown in FIG. 8.
Figure 10:
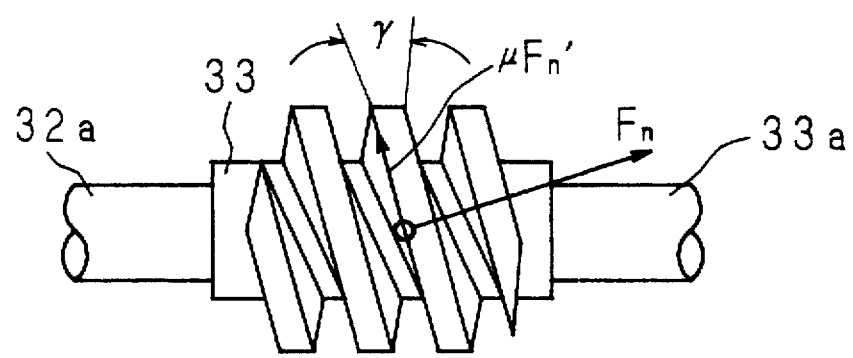
FIG. 10 is a perspective view of the worm gear of FIG. 9.
Figure 11:
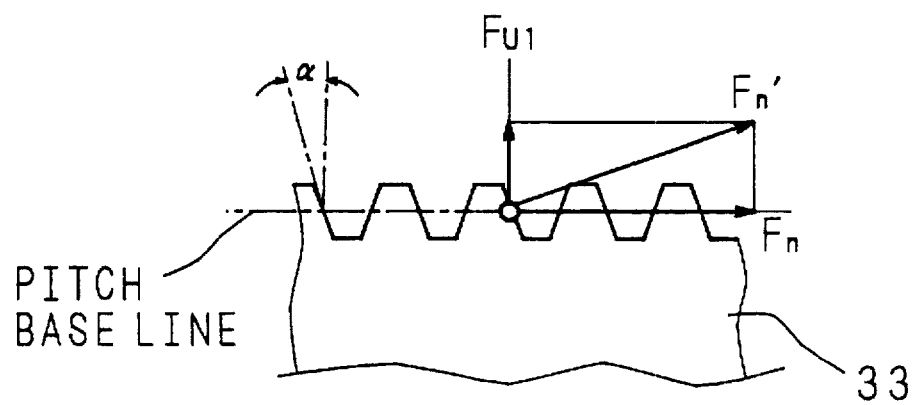
FIG. 11 is an schematic enlarged diagram of part of the worm gear of FIG. 9.

FIG. 9 is a schematic plane diagram of the worm gear 33 and the worm wheel 35b shown in FIG. 8, and FIGS. 10 and 11 are a perspective view and an schematic enlarged diagram of the worm gear 33, respectively. In these drawings, γ indicates a lead angle of the worm gear 33, $d_w$ indicates a pitch circle diameter of the worm gear 33, d indicates a pitch circle diameter of the worm wheel 35b, $F_{U1}$ indicates a tangential force of the worm gear 33, $F_S$ indicates a circumferential force of the worm wheel 35b, $F_n$ indicates a force vertically applied to the section of a gear tooth, α indicates a pressure angle, and μ indicates a friction coefficient. The lead angle γ is represented by the following equation (1):

$$\gamma = \tan^{-1}(m_m \cdot Z_w / d_w) \qquad (1)$$

wherein $m_m$ indicates a normal module; and $Z_w$ indicates a number of threads.

Further, the relationship between the tangential force $F_{U1}$ of the worm gear 33 and the circumferential force $F_S$ of the worm wheel 35b is represented by the following equation (2):

$$F_{U1} = F_S(\cos \alpha \cdot \sin \gamma - \mu \cos \gamma) \qquad (2)$$

The worm gear 33 of this invention has the lead angle γ that makes the tangential force larger than 0 (i.e., $F_{U1} > 0$), thereby transferring torque from the worm wheel 35b to the worm gear 33.

As shown in FIGS. 5 and 8, at the end of the side surface of the unit, case 31 facing the ring rib 7 is provided a leaf switch 41 for stopping feeding the motor 32 and the CRT, and on the circumferential surface of the ring rib 7 facing the leaf switch 41 is formed a flat belt-shaped cam 8 so as to be parallel to the bottom 1a of the base 1 and have a length corresponding to the rotation range of the cabinet 2 defined between the spring members 10 described above.

In the rotating apparatus having the aforementioned configuration, the power supply connected with the motor 32 is remotely controlled by a signal generated by an external switch (not shown) so as to rotate the motor 32 in the forward or reverse direction or stop the motor 32. The forward or reverse rotation of the motor 32 is transferred to the worm gear 33, the worm wheel 35b, the pinions 35c and 36c and the gears 36b and 37b. Through the rotation of the third gear 37b engaged with the inner gear 1g of the base 1, the cabinet 2 is rotated in the clockwise or counterclockwise direction on the unit roller 20. When the bar 2e projecting from the bottom surface of the cabinet 2 comes in contact with one of the spring members 10, further rotation of the cabinet, 2 is prevented by the spring member 10, and the leaf switch 41 is turned on through the contact with one end of the cam 8. As the leaf switch 41 is thus turned on, feeding the motor 32 is stopped, and the rotation of the motor 32 and the cabinet 2 is stopped.

While the cabinet 2 is rotating, the skirt 2a at the lower circumferential edge of the cabinet 2 prevents a finger, a hand or the like from being pinched in the gap between the cabinet 2 and the base 1. Further, the skirt 2a also prevents dust from coming into the rotating apparatus.

During the rotation, if the cabinet 2 comes in contact with furniture or the like, or if a finger, a hand or the like is pinched between the cabinet 2 and furniture or the like, the cabinet 2 is locked. At this point, since a voltage less than half a regulated voltage is applied to the motor 32 as mentioned above, the torque of the motor 32 is small, and the reduction ratio of the gear unit 30 is also so small as to allow the rotation of the cabinet 2. Accordingly, the cabinet 2 would not damage the pinched finger, the furniture or the like. Although the torque and the reduction ratio are small, the cabinet 2 can be rotated through the aid of the unit roller 20.

When the cabinet 2 is locked, the gear unit 30 is also locked, resulting in locking the rotation of the worm wheel 35b. At this point, since the worm gear 33 has the lead angle γ that makes the tangential force $F_{U1}$ of the worm gear 33 larger than 0 ($F_{U1} > 0$) as described above, the rotation of the worm gear 33 and the rotation axis 32a is also locked. As a result, the motor 32 is stopped since the torque of the motor 32 is sufficiently small. The motor 32 would not thermally damaged because the voltage applied to the motor 32 is small as described above.

When the cabinet 2 is manually rotated in order to change the facing direction without using the driving torque of the motor 32, the applied force is transferred to the worm gear 33 by the worm wheel 35b, thereby rotating the rotation axis 32a of the motor 32. As a result, the cabinet 2 can be manually rotated.

Due to the above-mentioned configuration, the number of the components of the gear unit can be reduced and the assembling procedure can be simplified, resulting in improved production efficiency and a decreased production cost.

Figure 12:
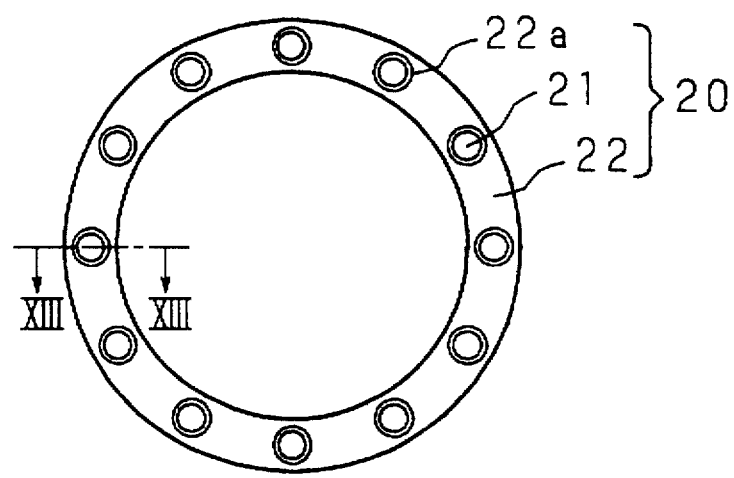
FIG. 12 is a plan view of a unit roller shown in FIG. 5.
Figure 13:
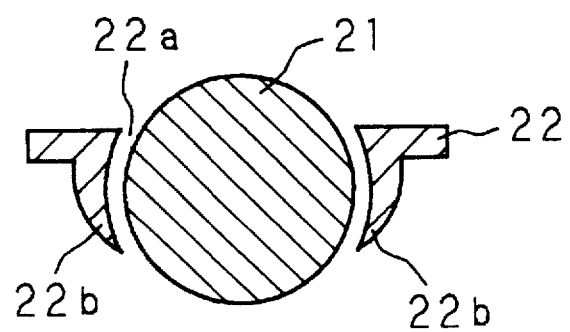
FIG. 13 is a sectional view taken along line XIII—XIII of FIG. 12.

FIG. 12 is a plan view of the unit roller 20 shown in FIG. 5, and FIG. 13 is a sectional view taken along line XIII—XIII of FIG. 12. The unit roller 20 comprises the ring-shaped retainer 22 and the balls 21 movably contained in a plurality of holding holes 22a provided on the retainer 22 with a predetermined interval thereamong. Each interval between the balls 21 is thus constantly maintained during the operation of the unit roller 20. The lower edge of each holding hole 22a on the bottom surface of the retainer 22 is provided with a pair of claws 22b in such a shape that the distance between the claws 22b reduces downward in accordance with the spherical shape of the ball 21 contained therein. A pair of these claws 22b prevents the balls 21 from dropping off the retainer 22 during the fixing procedure of the unit roller 20 on the rotating apparatus. Thus, the handling during the assemblage of the rotating apparatus is improved, thereby improving the assembling efficiency and the production efficiency.

Figure 14:
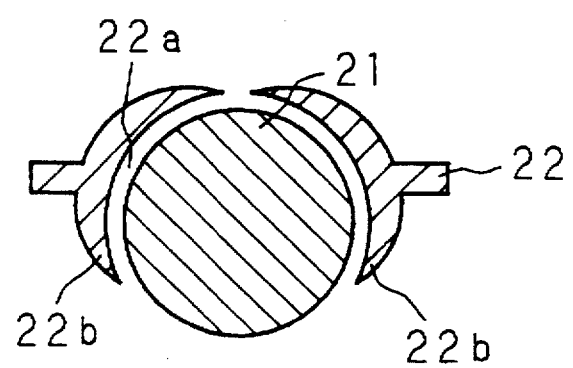
FIG. 14 is a sectional view of another type of a retainer applicable to the invention.

It is needless to say that the claw 22b can be provided around the whole lower edge of the holding hole 22a. Alternatively, the claw 22b can be formed both upper and lower edges of the retainer 22 so as to integrate the retainer 22 with the ball 21 as is shown in a sectional view of FIG. 14. When such a structure is adopted, there is no need to combine the balls 21 with the retainer 22 during the assemblage of the rotating apparatus, resulting in further improving the assembling efficiency of the rotating apparatus. Further, although the retainer 22 is in the ring shape in this embodiment, the shape of the retainer 22 is not limited to this and can be a disk. Furthermore, by determining the shape of the groove 1m formed on the outer peripheral wall 1b of the base 1 and the shape of the lower edge of the outer ring 2b of the cabinet 2 (both shown in FIG. 6) in accordance with the spherical shape of the ball 21, the cabinet 2 can be further smoothly rotated. Then, the output torque of the motor 32 (shown in FIG. 5) can be made further smaller.

Figure 15:
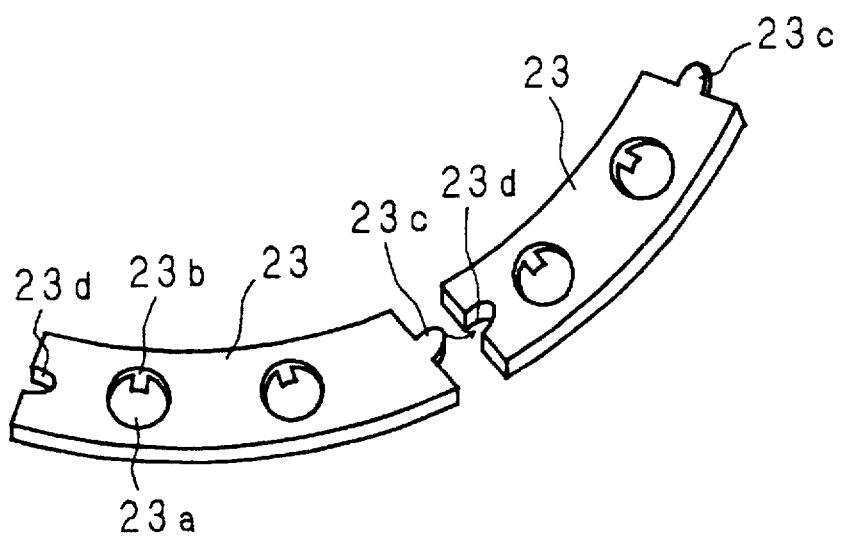
FIG. 15 is a partial perspective view of still another type of the retainer applicable to the invention.

FIG. 15 is a partially perspective view of another type of the retainer. This retainer comprises a plurality of flat arch-shaped members 23, each of which has a holding hole 23a. A projection 23c is formed at one end of the arch-shaped member 23 and a recess 23d is formed at the other end thereof. The projection 23c of one arch-shaped member 23 is fit with the recess 23d of another arch-shaped member 23, thereby connecting the plurality of arch-shaped members 23 with one another to form the flat ring-shaped retainer.

Figure 16:
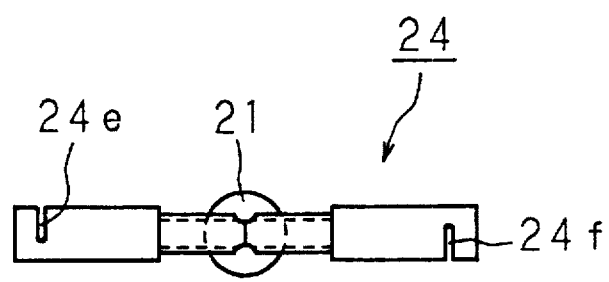
FIG. 16 is a side view of still another type of the retainer applicable to the invention.

FIG. 16 is a side view of still another type of the retainer. This retainer comprises a plurality of belt-shaped members 24, each having notches 24e and 24f in the reverse direction near the ends thereof. The notch 24e of one belt-shaped member 24 is inserted into the notch 24f of another belt-shaped member 24, thereby connecting the plurality of belt-shaped members 24 to form the ring-shaped retainer.

Figure 17:
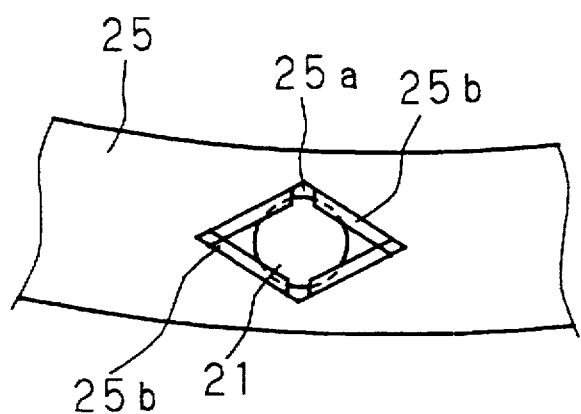
FIG. 17 is a plan view of further another type of the retainer applicable to the invention.

FIG. 17 is a plan view of still another type of the retainer. This ring-shaped retainer 25 includes a plurality of holding holes 25a in the shape of a rhombus with a predetermined interval thereamong. At the upper and lower edges of each holding hole 25a are provided flat claws 25b projecting inward of the holding hole 25a. The ball 21 inserted into the holding hole 25a can be movably held without dropping off the retainer 25 by the flat claws 25b. The holding holes formed on the ring-shaped retainer 25 with a predetermined interval thereamong can be in any polygonal shape.

Figure 18:
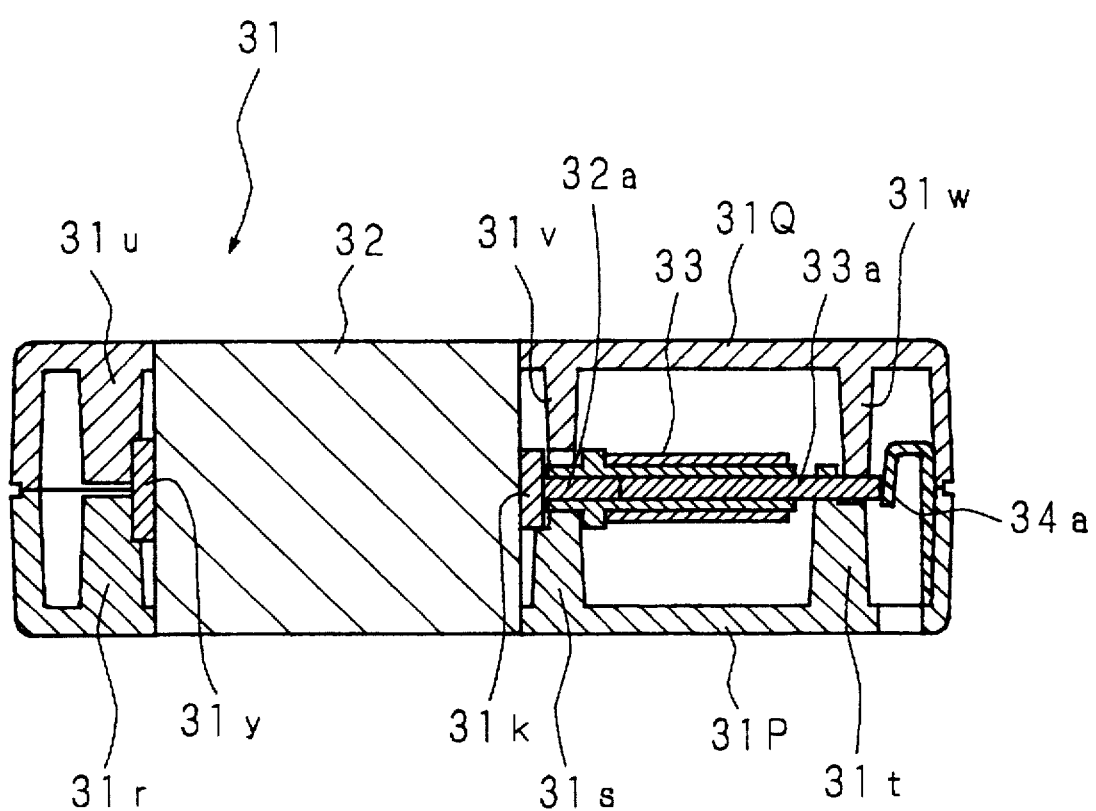
FIG. 18 is a sectional view of a unit case taken along line XVII—XVII of FIG. 8.

FIG. 18 is a sectional view taken along line XVII—XVII of FIG. 8. The unit case 31 comprises an upper house 31Q and a lower house 31P, and the motor 32 fixed on the cabinet 2 is fit in the holes provided on the upper and lower houses 31Q and 31P. From the inner surfaces of the upper and lower houses 31Q and 31P are projecting upper and lower worm holders 31v and 31s, respectively, for rotatably supporting the rotating axis 32a of the motor 32. The lower worm holder 31s also holds a ring-shaped bearing 31k for rotatably supporting the rotation axis 32a of the motor 32. The upper and lower houses 31Q and 31P also includes upper and lower motor holders 31u and 31r projecting from the other side of the motor 32 from the rotation axis 32a. The upper and lower motor holders 31u and 31r have a recess on the surface opposing the motor 32, in which a bearing 31y of the motor 32 is fit.

The rotation axis 32a of the motor 32 is inserted into the worm gear 33 from one end, and one end of a second rotation axis 33a is inserted thereinto from the other end. From the inner peripheral walls of the upper and lower houses 31Q and 31P are projecting upper and lower axis holders 31w and 31t, respectively, for rotatably supporting the second rotation axis 33a. The other end of the second rotation axis 33a, that is, the end not inserted into the worm gear 33, is projecting from the upper and lower axis holders 31w and 31t on the side not facing the worm gear 33. On the inner side wall of the lower house 31P opposing the upper and lower axis holders 31w and 31t is provided an anti-backlash member 34a in the shape of a hook. The anti-backlash member 34a is in contact with the end of the second rotation axis 33a projecting from the upper and lower axis holders 31w and 31t in the vicinity of the tip of the hook. This prevents the backlash of the second rotation axis 33a and the rotation axis 32a in the thrust direction.

Figure 19:
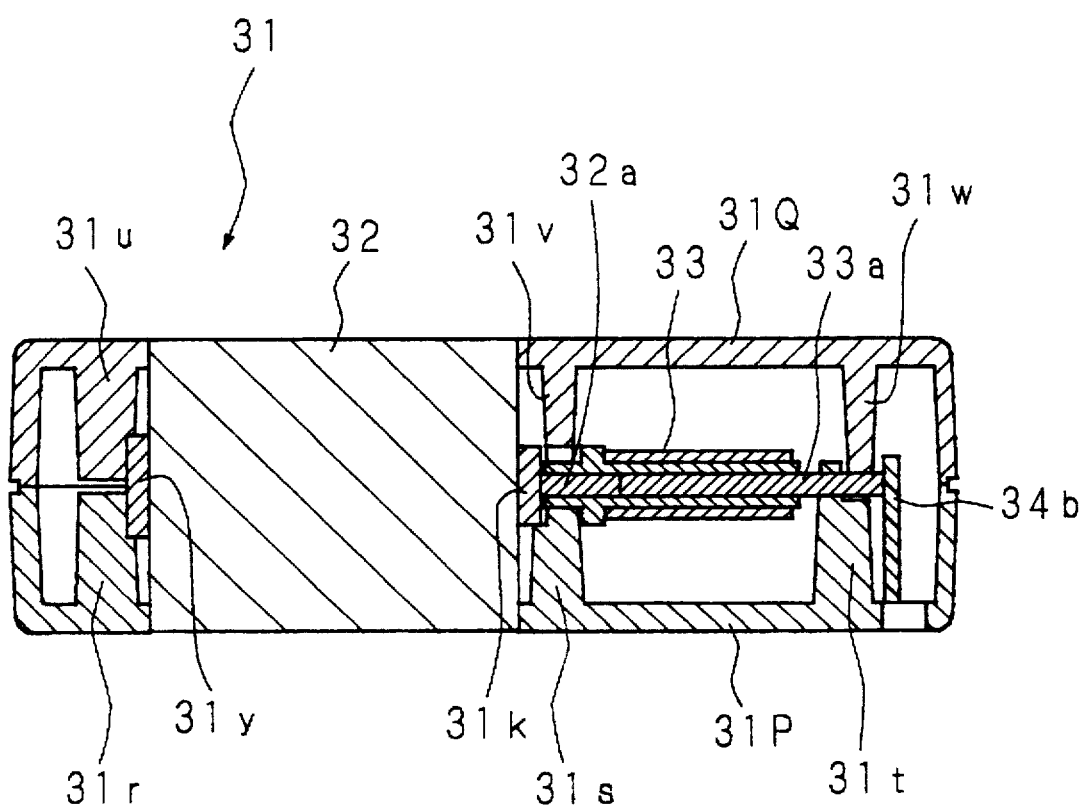
FIG. 19 is a schematic diagram of another type of the unit case applicable to the invention.

FIG. 19 is a schematic diagram showing another embodiment of the portion shown in FIG. 18. The anti-backlash member 34a in the shape of a hook in FIG. 18 is replaced with a flat anti-backlash member 34b in this embodiment. In FIG. 19, like reference numerals are used to referred to like elements used in FIG. 18 and the description thereof is omitted. This flat anti-backlash member 34b can also prevents the backlash of the second rotation axis 33a and the rotation axis 32a in the thrust direction.

Although the anti-backlash member 34a or 34b is herein independently provided in the unit case 31, which is an unlimited example, the anti-backlash member 34a or 34b can be integrated with the unit case 31. In this case, the assembling efficiency can be improved.

Figure 20:
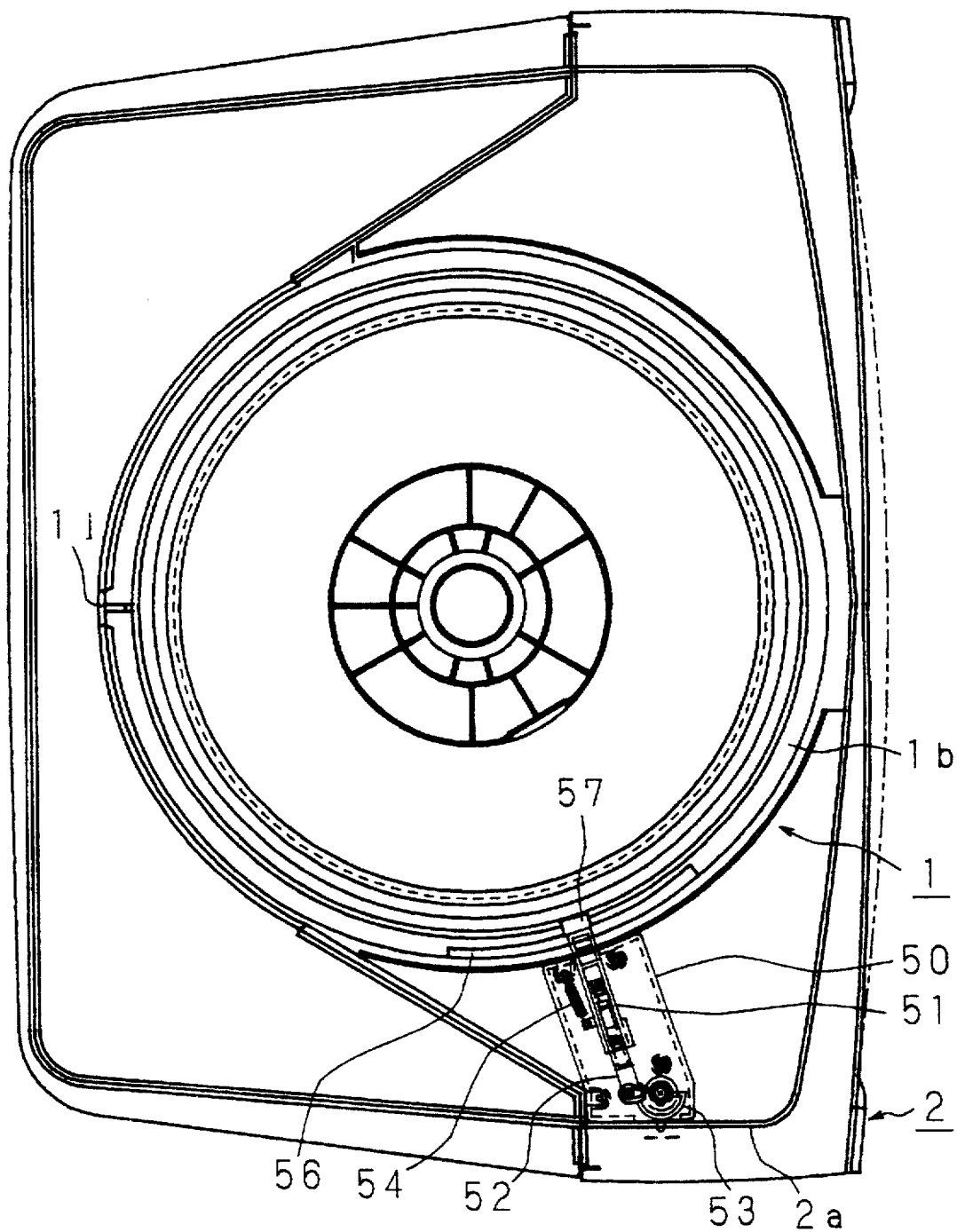
FIG. 20 is a plan view of a rotating apparatus according to another example of the invention.
Figure 21:
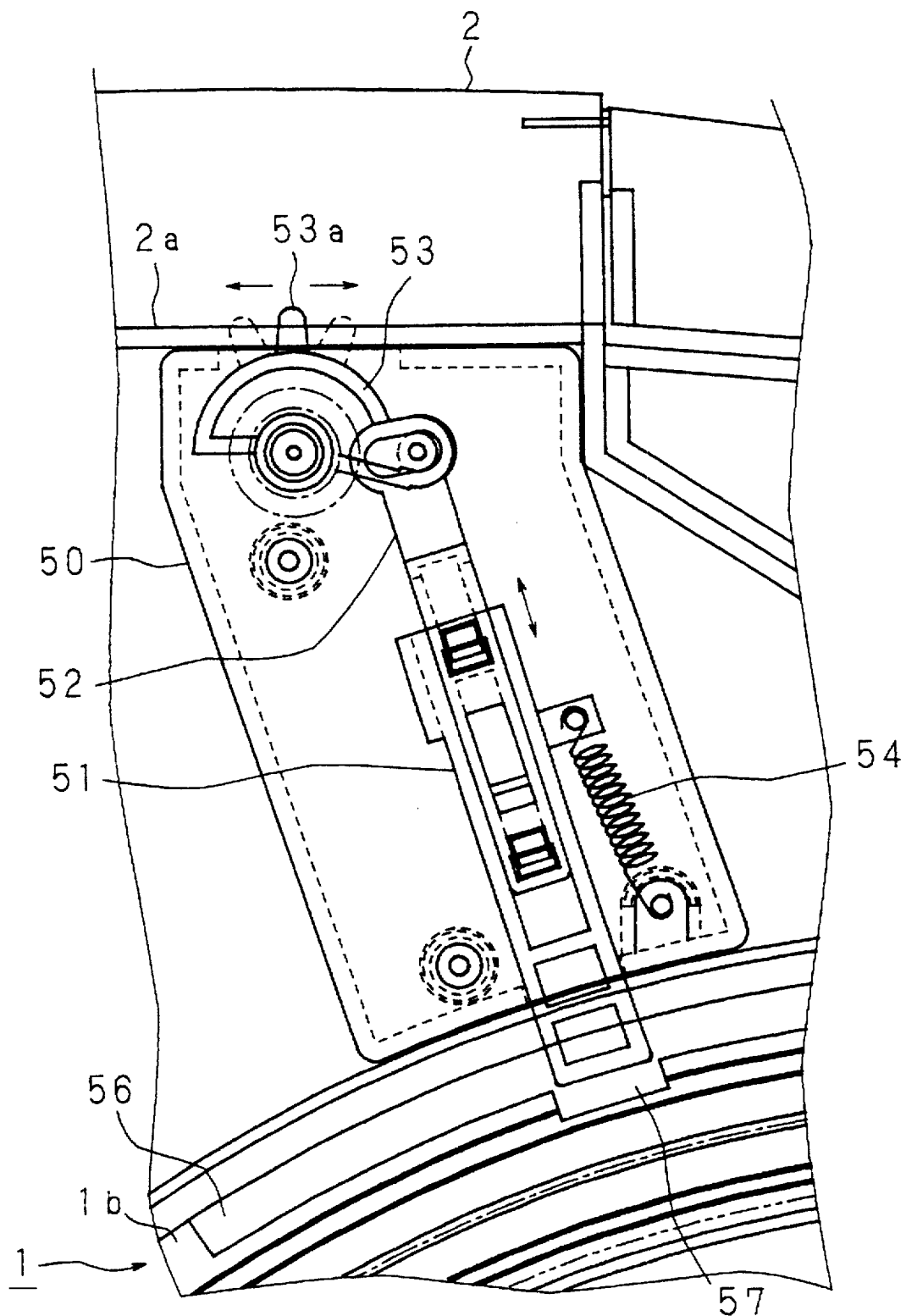
FIG. 21 is an enlarged view of part of the rotating apparatus of FIG. 20.

FIG. 20 is a plan view of a rotating apparatus according to another example of this invention, in which the spring members 10 and the bar 2e shown in FIG. 7 are replaced with another mechanism for regulating the rotation of the cabinet 2. FIG. 21 is a partially enlarged view of the apparatus of FIG. 20. On the outer peripheral surface of an outer peripheral wall 1b of a base 1 is formed a groove-shaped outer peripheral limit cam 56 having a predetermined length along the circumference of the outer peripheral wall 1b, and at the center of the outer peripheral limit cam 56 is formed a lock cam 57 in the shape of a recess. On the bottom surface of a cabinet, 2 is provided a hollow cover link 50 in the shape similar to a rectangle so as to oppose the outer peripheral lock cam 57. The cover link 50 houses a second link 51 in the shape of a cylinder one end of which is closed, and the second link 51 is disposed parallel to the bottom surface of the cabinet 2 so as to be able to move forward to or backward from the outer peripheral limit cam 56.

Into the second link 51 is inserted one end of a first link 52 in the shape of a hollow cylinder, and the second link 51 is caught by the first link 52 so that the second link 51 can be slided within the first link 52 by a predetermined distance. The other end of the first link 52 is hinged on a lever link 53 in the shape similar to a flat semicircle fixed on the cover link 50 with an axis. The lever link 53 comprises a projection 53a projecting outward from the side surface of the cabinet 2. The lever link 53 can be switched, through the rotation of the cabinet 2, between a first position, where the second link 51 comes in contact with either end of the outer peripheral limit cam 56, and a second position, where the second link 51 is positioned closer to the outer peripheral limit cam 56 than the first position.

The second link 51 is hooked to the cover link 50 through a spring 54. When the lever link 53 is at the second position, the second link 51 makes the first link 52 slide by the force of the spring 54, thereby fitting in the outer peripheral lock cam 57 on the base 1.

Figure 22:
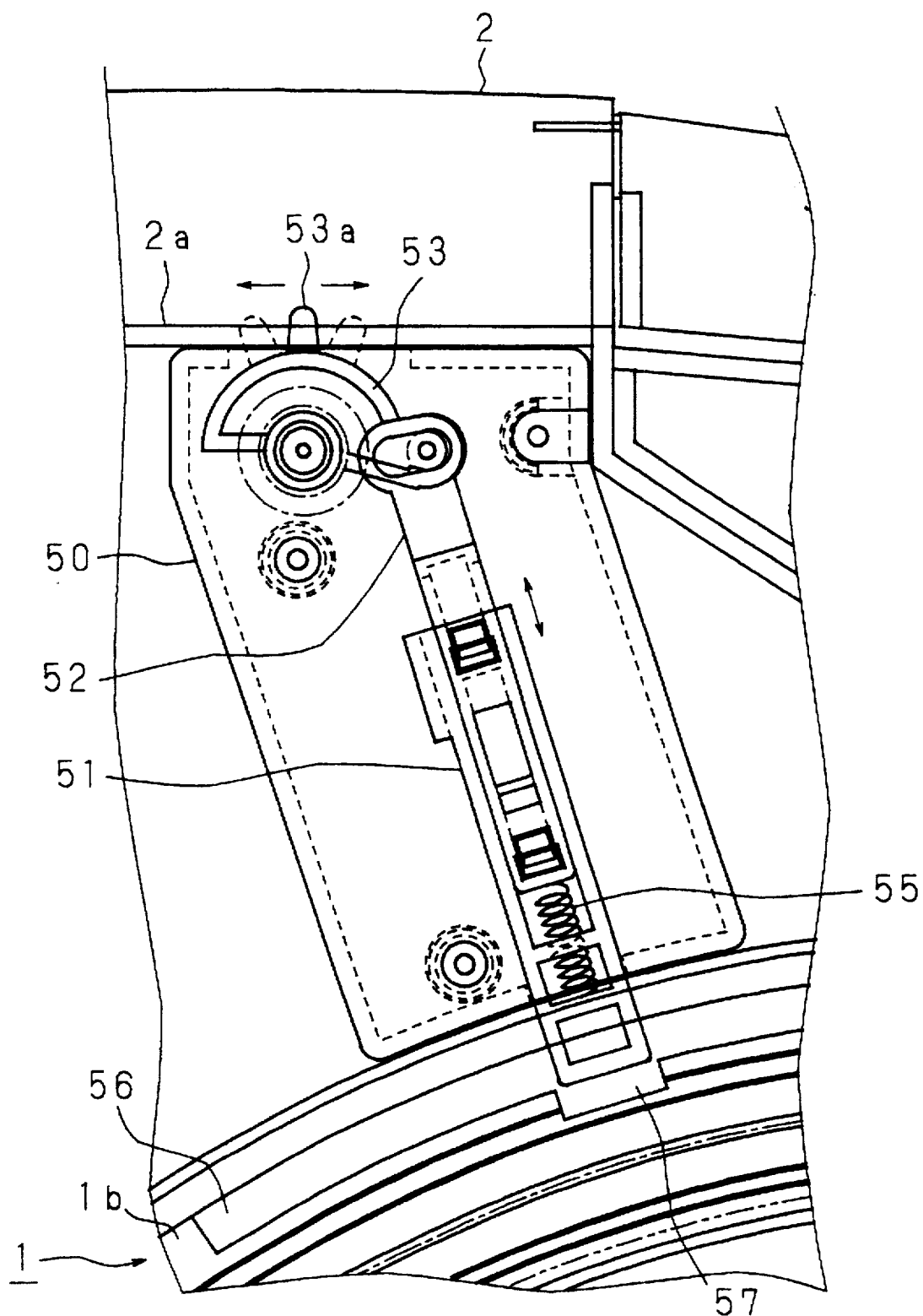
FIG. 22 is a schematic diagram showing another type of a first link and a second link shown in FIG. 21.

FIG. 22 is a schematic diagram showing another configuration of the first link 52 and the second link 51 shown in FIG. 21. At the tip of the first link 52 fit inside the second link 51 is fixed one end of a spring 55, the other end of which is fixed on the second link 51. Accordingly, when the lever link 53 is at the second position, the second link 51 makes the first link 52 slide by the force of the spring 55, thereby fitting in the outer peripheral lock cam 57 on the base 1.

Figure 23:
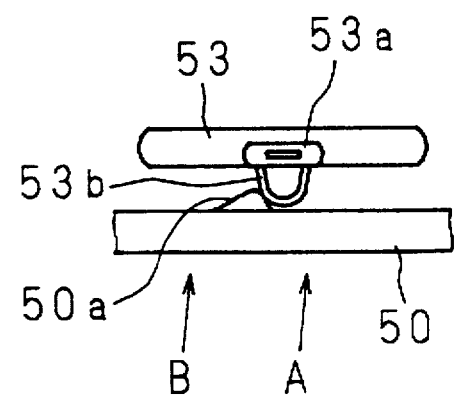
FIG. 23 is a side view showing a switching mechanism of a lever link according to the present invention.
Figure 24:
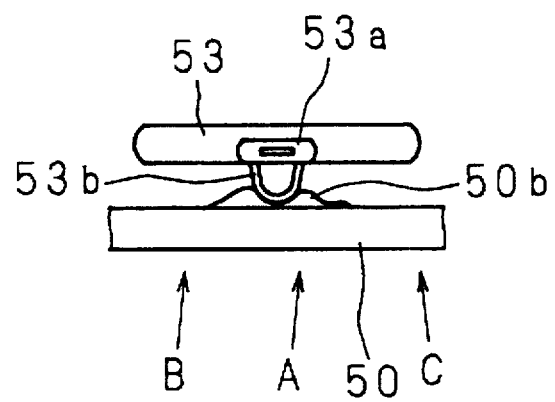
FIG. 24 is a side view of another type of the switching mechanism of the lever link according to the present invention.

FIGS. 23 and 24 are side views showing the switching mechanism of the lever link 53. FIG. 23 shows the mechanism for one-stage switching, and FIG. 24 shows the mechanism for two-stage switching. The bottom surface of the lever link 53 is provided with a lever link spring 53b in the shape similar to a semi-circular arch. The cover link 50 is provided with a single swelling 50a (shown in FIG. 23) or a double swelling 50b (shown in FIG. 24) at a position opposing the lever link spring 53b.

In the mechanism shown in FIG. 23, when the lever link 53 is positioned at a point A, the second link 51 is in contact with the outer peripheral limit cam 56 (both shown in FIG. 21). When the lever link 53 is operated so as to transform the lever link spring 53b to pass the swelling 50a, the second link 51 is fit in the outer peripheral lock cam 57. At this point, when the second link 51 and the outer peripheral lock cam 57 are positionally shifted from each other, the second link 51 is slided toward the first link 52 against the force of the spring 54, thereby pressing the tip of the second link 51 against the circumferential surface of the outer peripheral limit cam 56. When the positions of the second link 51 and the outer peripheral lock cam 57 are matched through the rotation of the cabinet 2, the second link 51 is pushed inward of the outer peripheral lock cam 57 by the force of the spring 54. When the lever link 53 is moved in the reverse direction from the swelling 50a, the second link 51 is moved toward the side surface of the cabinet 2 so as to lose the contact with the outer peripheral limit cam 56. As a result, it is possible to rotate the cabinet 2 beyond the range defined by the outer peripheral limit cam 56. Thus, it is possible to conduct any required operation such as connection of cords on the rear surface of the cabinet 2.

In the mechanism shown in FIG. 24, similarly to the above-mentioned mechanism, when the lever link 53 is positioned at a point C, the cabinet 2 can be optionally rotated. At a point A, the cabinet 2 can be rotated within the range defined by the outer peripheral limit cam 56, and at a point B, the cabinet 2 is locked. Therefore, when some operation such as connection of cords is required to be conducted on the rear surface of the cabinet 2, the cabinet 2 can be rotated beyond the range defined by the limit cam 56 by placing the lever link 53 at the point C. When the lever link 53 is positioned at the point A, the rotation range of the cabinet 2 through remote control is limited within the range defined by the outer peripheral limit cam 56. When the lever link 53 is positioned at the point B, the base 1 is fixed at the center of the rotation range, which is convenient for positioning of the cabinet 2 after moving the apparatus from one place to another.

Although the rotating apparatus in which the cabinet is rotatably fixed on the base is described in the aforementioned embodiment, the present invention is not limited to this, and needless to say, can be applied to a rotating apparatus comprising a base and a mounting table rotatably fixed thereon.

Figure 25:
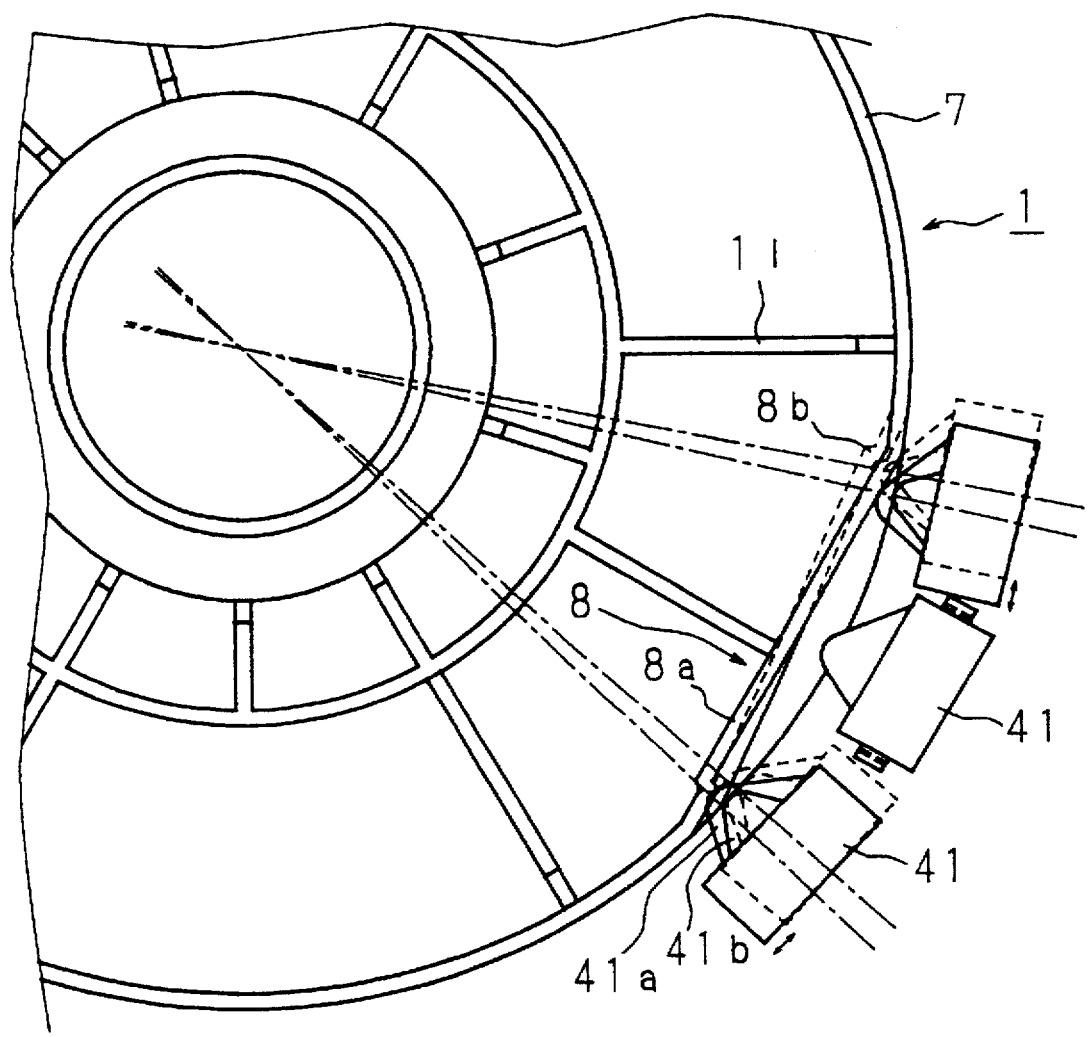
FIG. 25 is an enlarged view of a leaf switch and a cam shown in FIG. 5.
Figure 26:
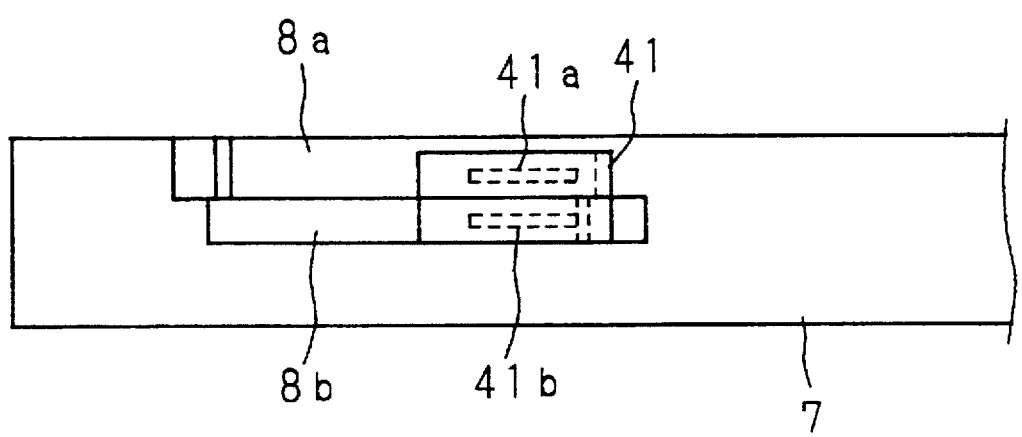
FIG. 26 is a schematic side diagram of the leaf switch and the cam of FIG. 25.

FIG. 25 is an enlarged view of the leaf switch 41 and the cam 8 shown in FIG. 5, and FIG. 26 is a schematic side diagram thereof. The leaf switch 41 comprises crooked upper lever 41a and lower lever 41b opposing the ring rib 7 on the base 1. The circumferential surface of the ring rib 7 is provided with an upper cam 8a and a lower cam 8b both in the shape similar to a flat belt at positions corresponding to the upper and lower levers 41a and 41b.

The upper cam 8a is gradually inclined toward the center of the ring rib 7 from one end thereof, and the lower cam 8b is also gradually inclined toward the center of the ring rib 7 from the other end of the upper cam 8a. When the rotation of the cabinet 2 brings the upper lever 41a into contact with the inclination starting portion of the upper cam 8a, the lower lever 41b is not in contact with the lower cam 8b. When the lower lever 41b is in contact with the inclination starting portion of the lower cam 8b, the upper lever 41a is not in contact with the upper cam 8a. Thus, the upper and lower levers 41a and 41b are not in contact with the upper and lower cams 8a and 8b between the ends thereof.

When the upper and lower levers 41a and 41b come in contact with the upper and lower cams 8a and 8b through the rotation of the cabinet 2 so as to turn on one of the levers 41a and 41b, it is determined that the cabinet 2 has been rotated up to the rotation limit by the remote control and the leaf switch 41 supplies a signal to the power supply for stopping feeding the motor, that is, the driving source of the rotation. When the cabinet 2 is manually rotated beyond the rotation range defined by the upper and lower cams 8a and 8b, both the upper and lower levers 41a and 41b are turned on, and the leaf switch 41 supplies a signal to the power supply for stopping feeding the CRT. Further, when one of the upper and lower levers 41a and 41b is turned off again, the leaf switch 41 supplies a signal to the power supply for feeding the CRT. In the conventional rotating apparatus, when the cabinet is largely rotated, image turbulence is caused on the CRT by the rotation and the earth magnetism. In the present apparatus, however, the image turbulence is suppressed owing to this configuration.

Figure 27:
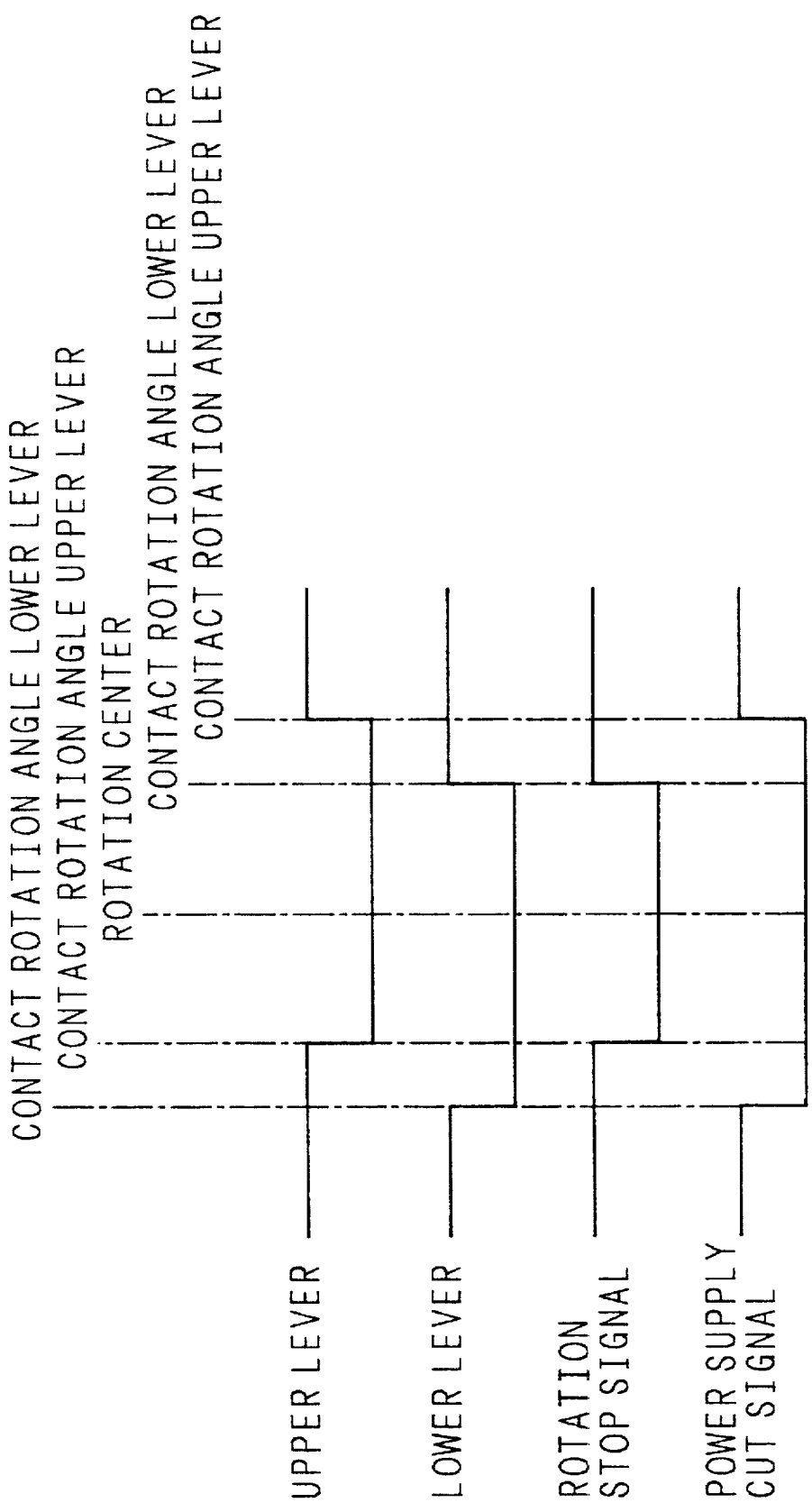
FIG. 27 shows an operation sequence of the leaf switch according to the present invention.

FIG. 27 shows an operation sequence of the leaf switch 41, wherein "rotation center" indicates the position where the center of the image screen of the CRT and the center boss of the base (see FIG. 5) are matched. The cabinet is rotated in the clockwise or counterclockwise direction at a desired angle by driving the motor by a signal sent by the remote control. When the upper lever of the leaf switch comes in contact with the upper cam to be turned on, the leaf switch outputs a rotation stop signal for stopping the rotation of the motor for the rotation direction. When the motor is driven by a signal for the reverse rotation sent by the remote control so as to turn off the upper lever, the leaf switch stops outputting the rotation stop signal. When the lower lever of the leaf switch comes in contact with the lower cam to be turned on, or when the motor is driven by a signal for the reverse rotation sent by the remote control so as to turn off the lower lever, the leaf switch performs the similar operation.

After the cabinet is rotated in the clockwise or counterclockwise direction at a desired angle and the upper lever of the leaf switch comes in contact with the upper cam to be turned on so as to stop the rotation of the motor, if the cabinet is further rotated manually, both the upper and the lower levers are turned on. At this point, the leaf switch outputs a power supply cut signal so as to stop feeding the CRT. After the lower lever of the leaf switch comes in contact with the lower cam to be turned on so as to stop the rotation of the motor, if the cabinet is further rotated manually, the leaf switch performs the same operation.

Figure 28:
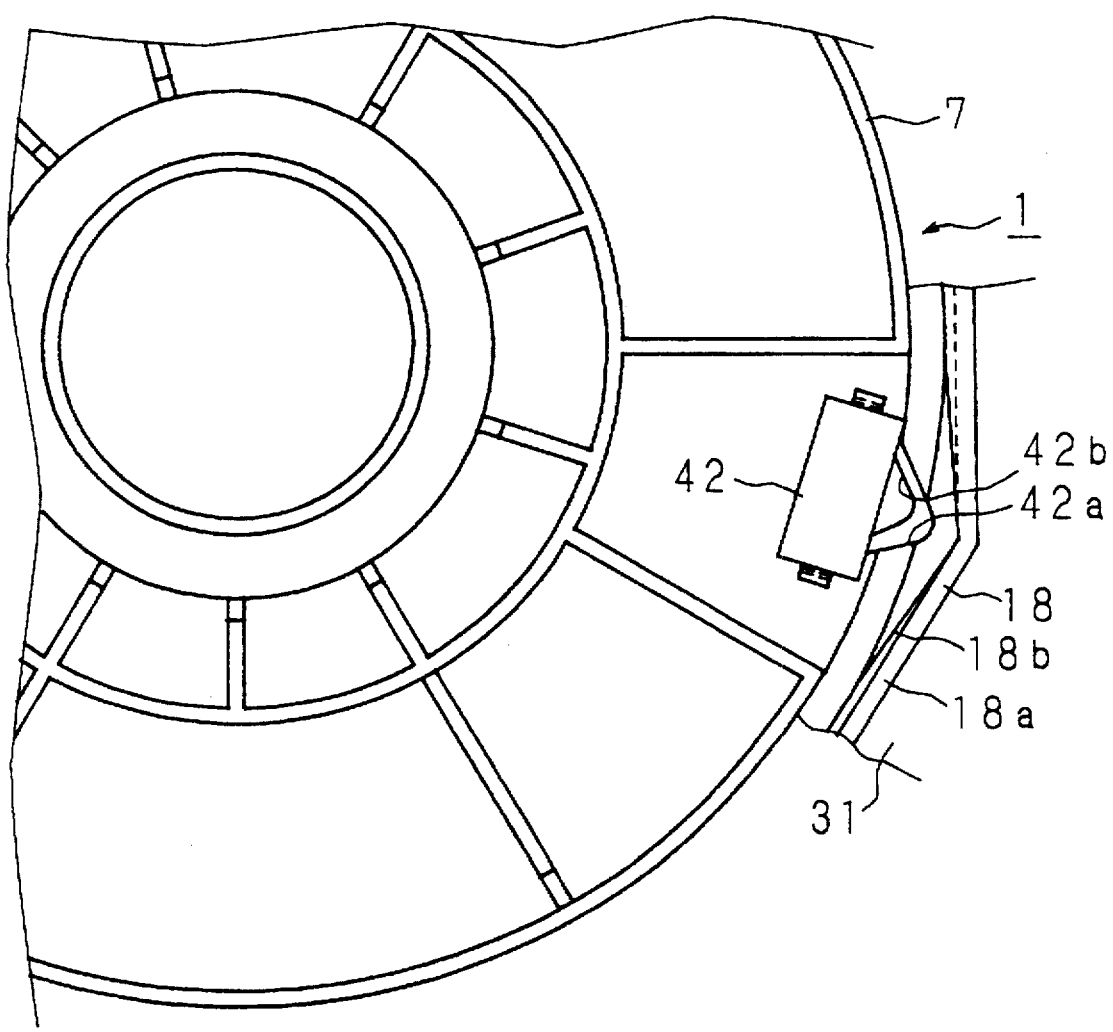
FIG. 28 is a schematic diagram showing another type of the leaf switch and the cam according to the present invention.

FIG. 28 is a schematic diagram showing another configuration of the leaf switch and the cam, wherein the leaf switch is disposed on the base and the cam is disposed on the cabinet. The base 1 is provided with a leaf switch 42 in such a manner that upper and lower levers 42a and 42b are projecting from the ring rib 7. On the side surface of the unit cover (see FIG. 5) opposing the upper and lower levers 42a and 42b of the leaf switch 42 are disposed crooked upper and lower cams 18a and 18b which is the crooked shape in such a manner that the both ends thereof are disposed in the vicinity of the ring rib 7. The upper and lower cams 18a and 18b are positioned so that they are slightly rotated in the reverse direction from each other with their crooked points as the rotation axes. When the upper lever 42a comes in contact with the end of the upper cam 18a through the rotation of the cabinet, the lower lever 42b is not in contact with the lower cam 18b. When the lower lever 42b comes in contact with the end of the lower cam 18b, the upper lever 42a is not in contact with the upper cam 18a.

Figure 29:
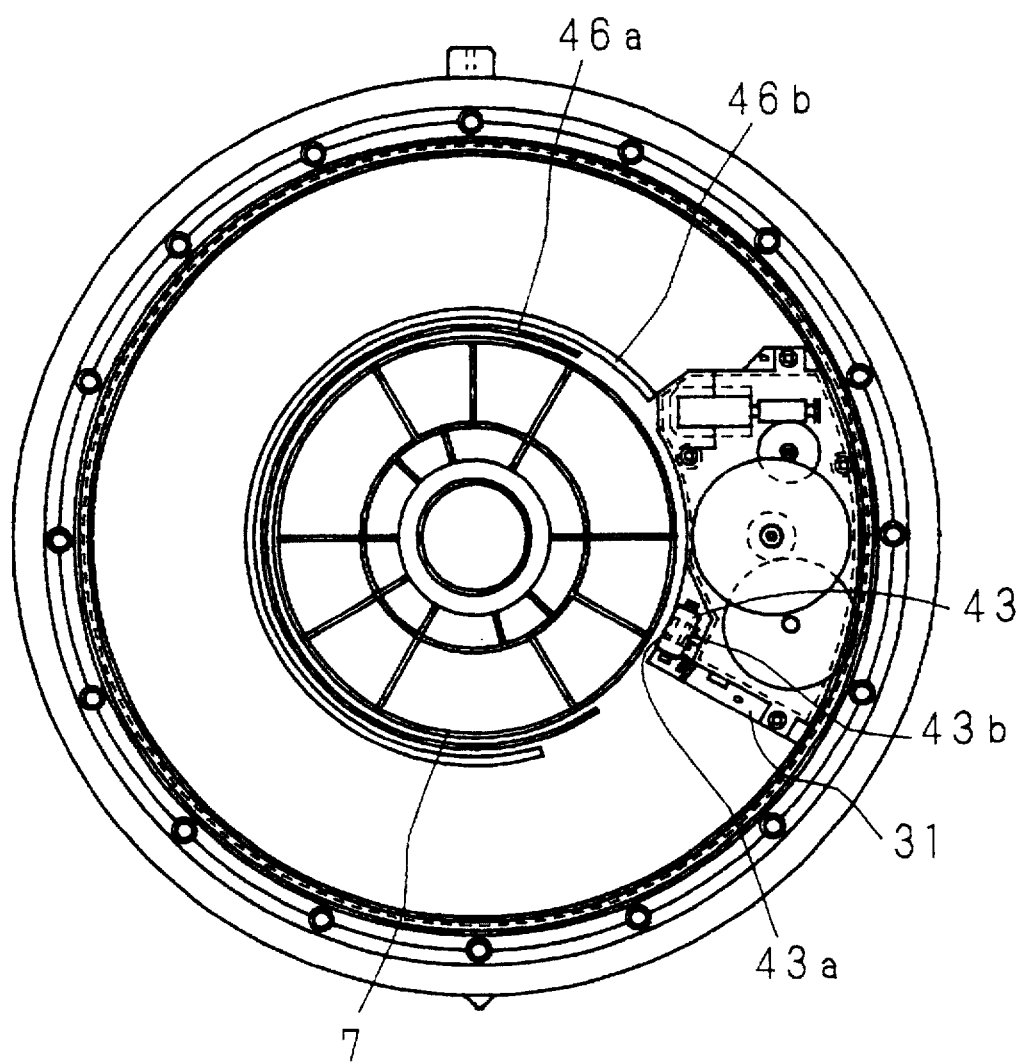
FIG. 29 is a schematic diagram showing still another type of the leaf switch and the cam according to the present invention.
Figure 30:
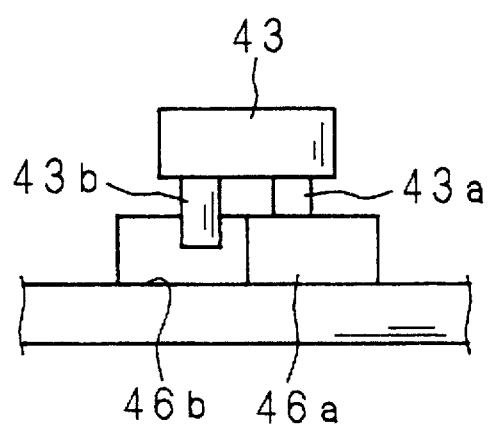
FIG. 30 is a schematic partial enlarged diagram of the leaf switch and the cam of FIG. 29.
Figure 31:
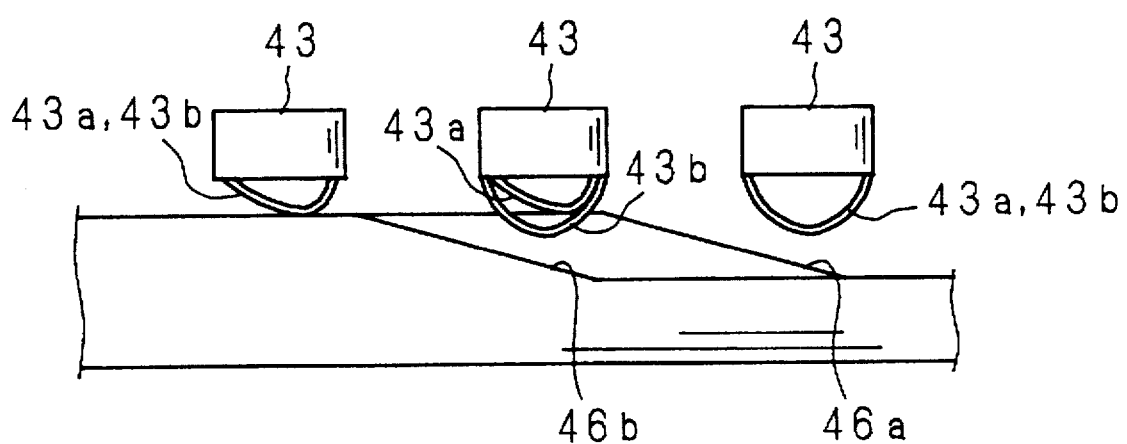
FIG. 31 is another schematic partial enlarged diagram of the leaf switch and the cam of FIG. 29.

FIG. 29 is a schematic diagram showing still another configuration of the leaf switch and the cam, wherein the cam is disposed on the bottom of the base and the lever of the leaf switch is disposed so as to correspond to the cam. FIG. 30 is a schematic enlarged front view of the leaf switch and the cam of FIG. 29, and FIG. 31 is a schematic enlarged side view thereof. On the outside of the ring rib 7 is provided an inner cam 46a concentrically with the ring rib 7 in the shape of a circular arch with a missing portion. On further outside of the inner cam 46a is provided an outer cam 46b also concentrically with the ring rib 7 in the shape of a circular arch with a missing portion, whose position is different from that of the missing portion of the inner cam 46a. The ends of the missing portions of the inner and outer cams 46a and 46b are inclined.

A leaf switch 43 is disposed on the inner side surface of the unit case 31, and the bottom of the leaf switch 43 is provided with an inner lever 43a and an outer lever 43b corresponding to the inner and outer cams 46a and 46b, respectively. When the inner and outer levers 43a and 43b come in contact with the inner and outer cams 46a and 46b through the rotation of the cabinet to turn on one of the inner and outer levers 43a and 43b, the leaf switch 43 supplies a signal to the power supply for stopping feeding the motor. When both the inner and outer levers 43a and 43b are turned on, the leaf switch 43 supplies a signal to the power supply for stopping feeding the CRT.

Figure 32:
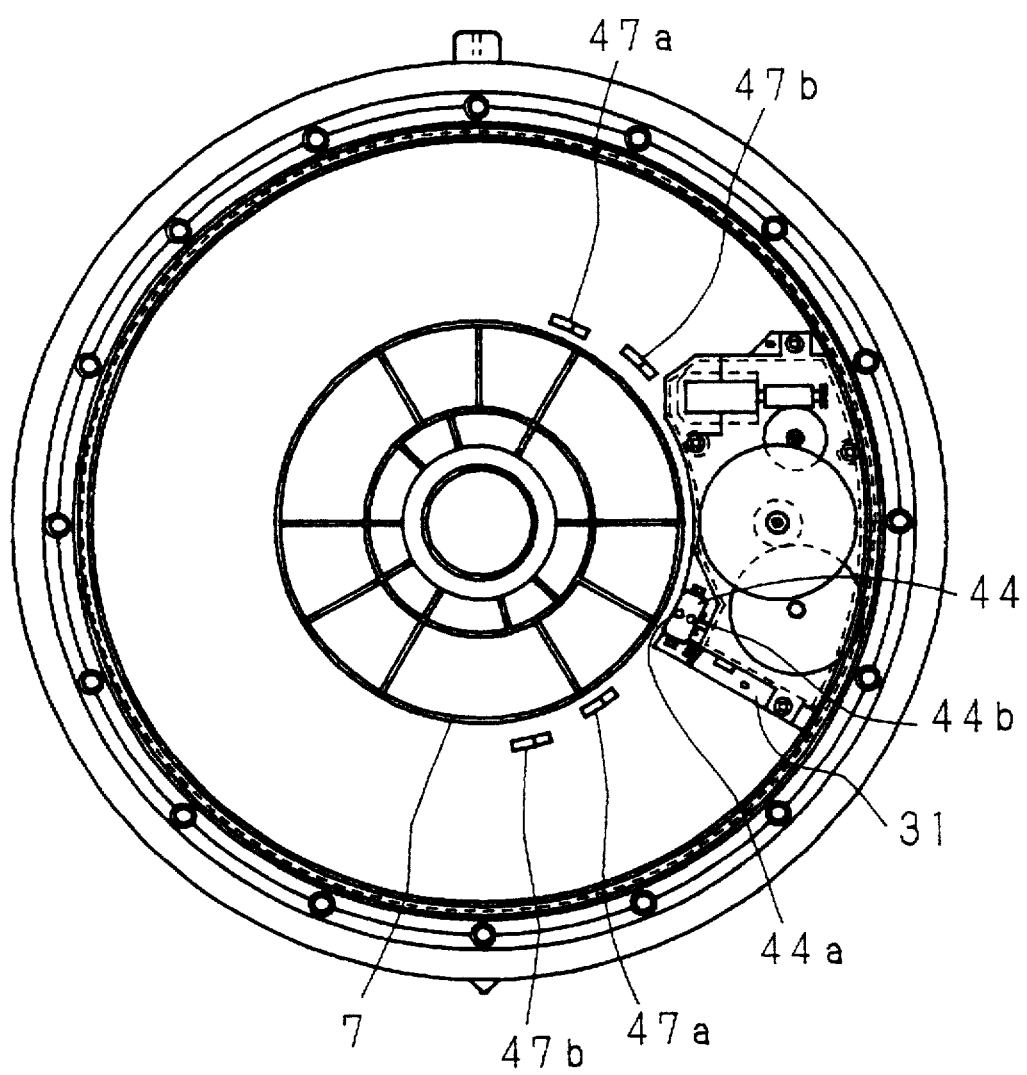
FIG. 32 is a schematic diagram showing another type of a motor stopping mechanism according to the present invention.

FIG. 32 is a schematic diagram showing another configuration of the motor stopping mechanism as described above, wherein the leaf switch is replaced with a push switch. In the vicinity of the ring rib 7 are disposed a pair of crooked small springs 47a with a predetermined interval therebetween along the circumferential direction of the ring rib 7. On further outside are disposed a pair of large springs 47b with a predetermined interval therebetween along the circumferential direction of the ring rib 7 at different positions from those of the small springs 47a. A push switch 44 is disposed on the inner side surface of the unit case 31, and the bottom face of the push switch 44 is provided with an inner button 44a and an outer button 44b so as to correspond to the small springs 47a and the large springs 47b, respectively. When the inner and outer buttons 44a and 44b come in contact with the small springs 47a and the large springs 47b to be turned on, the push switch 44 performs the similar operation to that of any of the aforementioned leaf switches.

As described above, in the present rotating apparatus, the assembling efficiency and the production efficiency can be improved. As a result, the invention can attain excellent effects such as that the throughput in the assembling line is increased and that the production cost is decreased.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A rotating apparatus for rotating an object, comprising:
   a base;
   a rotation table rotatably supported on said base wherein said rotation table can support the object;
   a driving unit for rotating said rotation table; and
   a motor for supplying torque to said driving unit, wherein said driving unit includes:
   a worm gear fixed on a rotatable axle of said motor;
   a worm wheel engaged with said worm gear; and
   a gear for transferring to said rotation table torque supplied from said worm gear to said worm wheel,
   first and second spring members projecting upward from said base and having a first predetermined arcuate distance therebetween for establishing a first rotation range of said rotation table,
   a bar projecting downward from said rotation table,
   wherein when said rotation table is rotated by said driving unit to a limit of the first rotation range, said bar is caught by one of said spring members thereby stopping rotation, and wherein when said rotation table is rotated manually to the limit of the first rotation range, said bar is caught by one of said spring members thereby stopping rotation until a sufficient manual rotating force is applied to deform said spring member and permit further rotation beyond the first rotation range.

2. The rotating apparatus according to claim 1, further comprising:
   a plurality of spheres provided between said base and said rotation table;
   a ring-shaped retainer having a plurality of holes for containing said spheres; and
   pairs of claw-shaped projections disposed at lower peripheral edges of said holes in said ring-shaped retainer wherein each pair of projections has a distance therebetween which is larger at the top of the projections than at the bottom of the projections for containing said spheres.

3. The rotating apparatus according to claim 2, wherein said ring-shaped retainer is integrated with said spheres so that said spheres are movably contained in said holes.

4. The rotating apparatus according to claim 2, wherein said retainer is formed of a plurality of belt-shaped membranes connected with one another.

5. The rotating apparatus to claim 4, wherein said retainer is integrated with said spheres so that said spheres are movably contained in said holes.

6. The rotating apparatus according to claim 1, further comprising:
   first and second stoppers projecting upward from said base and having a second predetermined arcuate distance therebetween for establishing a second rotation range of said rotation table,
   wherein when said rotation table is rotated manually beyond the first rotation range, said bar is caught by one of said stoppers thereby stopping rotation within the second rotation range.

7. The rotating apparatus according to claim 1, said rotation table including a skirt at a lower, frontal portion thereof, said skirt adapted to substantially close a gap between said rotation table and a support surface supporting said base.

8. The rotating apparatus according to claim 1, further comprising:
   a case for rotatably holding said motor and said worm gear,
   an antibacklash member provided on an inside surface of said case and contacting the rotatable axle of said motor for preventing backlash of the rotatable axle.

9. A rotating apparatus for rotating an object, comprising:
   a base;
   a rotation table rotatably supported on said base wherein said rotation table can support the object;
   a driving unit for rotating said rotation table; and
   a motor for supplying torque to said driving unit,
   wherein said driving unit includes:
   a worm gear fixed on a rotatable axle of said motor; and
   a worm wheel engaged with said worm gear;
   first and second spring members projecting upward from said base and having a first predetermined arcuate distance therebetween for establishing a first rotation range of said rotation table,
   a bar projecting downward from said rotation table,
   wherein when said rotation table is rotated by said driving unit to a limit of the first rotation range, said bar is caught by one of said spring members thereby stopping rotation, and wherein when said rotation table is rotated manually to the limit of the first rotation range, said bar is caught by one of said spring members thereby stopping rotation until a sufficient manual rotating force is applied to deform said spring member and permit further rotation beyond the first rotation range.

10. The rotating apparatus according to claim 9, further comprising:

stoppers projecting upward from said base and having a second predetermined arcuate distance therebetween for establishing a second rotation range of said rotation table, wherein when said rotation table is rotated manually beyond the first rotation range, said bar is caught by one of said stoppers thereby stopping rotation within the second rotation range.

11. The rotating apparatus according to claim 9, said rotation table including a skirt at a lower, frontal portion thereof, said skirt adapted to substantially close a gap between said rotation table and a support surface supporting said base.

12. The rotating apparatus according to claim 9, further comprising:

a case for rotatably holding said motor and said worm gear, an antibacklash member provided on an inside surface of said case and contacting the rotatable axle of said motor for preventing backlash of the rotatable axle.

13. A rotating apparatus for rotating an object, comprising:

a base;

a rotation table rotatably supported on said base wherein said rotation table can support the object;

a driving unit for rotating said rotation table;

a motor for supplying torque to said driving unit, wherein said driving unit includes:
a worm gear fixed on a rotatable axle of said motor;
a worm wheel engaged with said worm gear; and
a gear for transferring to said rotation table torque supplied from said worm gear to said worm wheel, a cam provided along an inner arcuate portion of said base and having a length corresponding to a first rotation range of said rotation table, and a leaf switch provided on said rotation table, said leaf switch contacting said cam when said rotation table is within the first rotation range, said cam further including an upper cam having an upper cam length which gradually inclines towards a center of said base from a first end of said cam and a lower cam having a lower cam length which gradually inclines towards the center of said base from a second end of said cam, wherein overlap of the upper cam length and lower cam length defines the first rotation range, said leaf switch further including an upper lever for engaging said upper cam and a lower lever for engaging said lower cam, wherein when said upper lever disengages from said upper cam or said lower lever disengages from said lower cam, said leaf switch sends a signal which instructs said driving unit to stop rotating said rotation table.

14. The rotating apparatus according to claim 13, further comprising:

a power supply for supplying power to the object, wherein when both said upper lever and said lower lever disengage from said upper cam and said lower cam, respectively said leaf switch supplies a signal to said power supply to stop supplying power to the object.

15. A rotating apparatus for rotating an object comprising:

a base for holding the object;

a rotation table rotatably supported on said base;

a driving unit for rotating said rotation table;

a motor for supplying torque to said driving unit, wherein said driving unit includes:
a worm gear fixed on a rotatable axle of said motor; and
a worm wheel engaged with said worm gear;

a cam provided along an inner arcuate portion of said base and having a length corresponding to a first rotation range of said rotation table, and a leaf switch provided on said rotation table, said leaf switch contacting said cam when said rotation table is within the first rotation range, said cam further including an upper cam having an upper cam length which gradually inclines towards a center of said base from a first end of said cam and a lower cam having a lower cam length which gradually inclines towards the center of said base from a second end of said cam, wherein overlap of the upper cam length and lower cam length defines the first rotation range, said leaf switch further including an upper lever for engaging said upper cam and a lower lever for engaging said lower cam, wherein when said upper lever disengages from said upper cam or said lower lever disengages from said lower cam, said leaf switch sends a signal which instructs said driving unit to stop rotating said rotation table.

16. The rotating apparatus according to claim 15, further comprising:

a power supply for supplying power to the object, wherein when both said upper lever and said lower lever disengage from said upper cam and said lower cam, respectively said leaf switch supplies a signal to said power supply to stop supplying power to the object.

* * * * *